(12) United States Patent
Suzuki et al.

(10) Patent No.: US 8,854,657 B2
(45) Date of Patent: Oct. 7, 2014

(54) REQUESTING THROUGH WIRED COMMUNICATION A DIAGNOSTIC SIGNAL THROUGH WIRELESS COMMUNICATION

(75) Inventors: Hiroyuki Suzuki, Shiojiri (JP); Yasuhiro Oshima, Matsumoto (JP); Kenji Sakuda, Suwa (JP); Shinji Konishi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 13/016,471

(22) Filed: Jan. 28, 2011

(65) Prior Publication Data

US 2011/0188079 A1 Aug. 4, 2011

(30) Foreign Application Priority Data

Jan. 29, 2010 (JP) ................... 2010-018114

(51) Int. Cl.
*G06F 3/12* (2006.01)
(52) U.S. Cl.
CPC ....................... *G06F 3/12* (2013.01)
USPC ........................................ 358/1.15
(58) Field of Classification Search
USPC ........................................ 358/1.15
See application file for complete search history.

(56) References Cited

U.S. PATENT DOCUMENTS

| 7,302,615 B2 | 11/2007 | Sakai |
| 7,599,083 B2 * | 10/2009 | Reese et al. .................. 358/1.15 |
| 7,869,073 B2 | 1/2011 | Oshima |
| 2004/0054902 A1 * | 3/2004 | Fujimoto et al. ............. 713/168 |
| 2004/0230875 A1 | 11/2004 | Kapauan et al. |
| 2007/0087696 A1 | 4/2007 | D. Bonta et al. |
| 2011/0191631 A1 | 8/2011 | Suzuki et al. |

FOREIGN PATENT DOCUMENTS

| JP | 2006-067373 A | 3/2006 |
| JP | 2006-270193 A | 10/2006 |
| JP | 2007-036665 A | 2/2007 |
| JP | 2007-081890 A | 3/2007 |
| JP | 2007-088726 A | 4/2007 |
| JP | 2009-38665 A | 2/2009 |
| WO | 01/52516 A2 | 7/2001 |

OTHER PUBLICATIONS

Windows XP.*
Ubuntu Forums located at http://ubuntuforums.org/showthread. php?t=1078789.*
WO/2009/070898 to Monsarrat-Chanon, Hami; Publication Date: Nov. 6, 2009.*
Ubuntu Forums located at http://ubuntuforums.org/showthread. php?t=1078789 with a last edit date of Feb. 24, 2009.*

* cited by examiner

*Primary Examiner* — Eric A Rust
(74) *Attorney, Agent, or Firm* — Nutter McClennen & Fish LLP

(57) ABSTRACT

An information processing apparatus includes: a first communication section which communicates with an external device having a diagnosis function of a network using a first communication method; a second communication section which communicates with the external device using a second communication method; and a transmission section which transmits a diagnosis signal to the external device through the second communication section. The transmission section transmits the diagnosis signal according to a diagnosis request received through the first communication section from the external device.

16 Claims, 15 Drawing Sheets

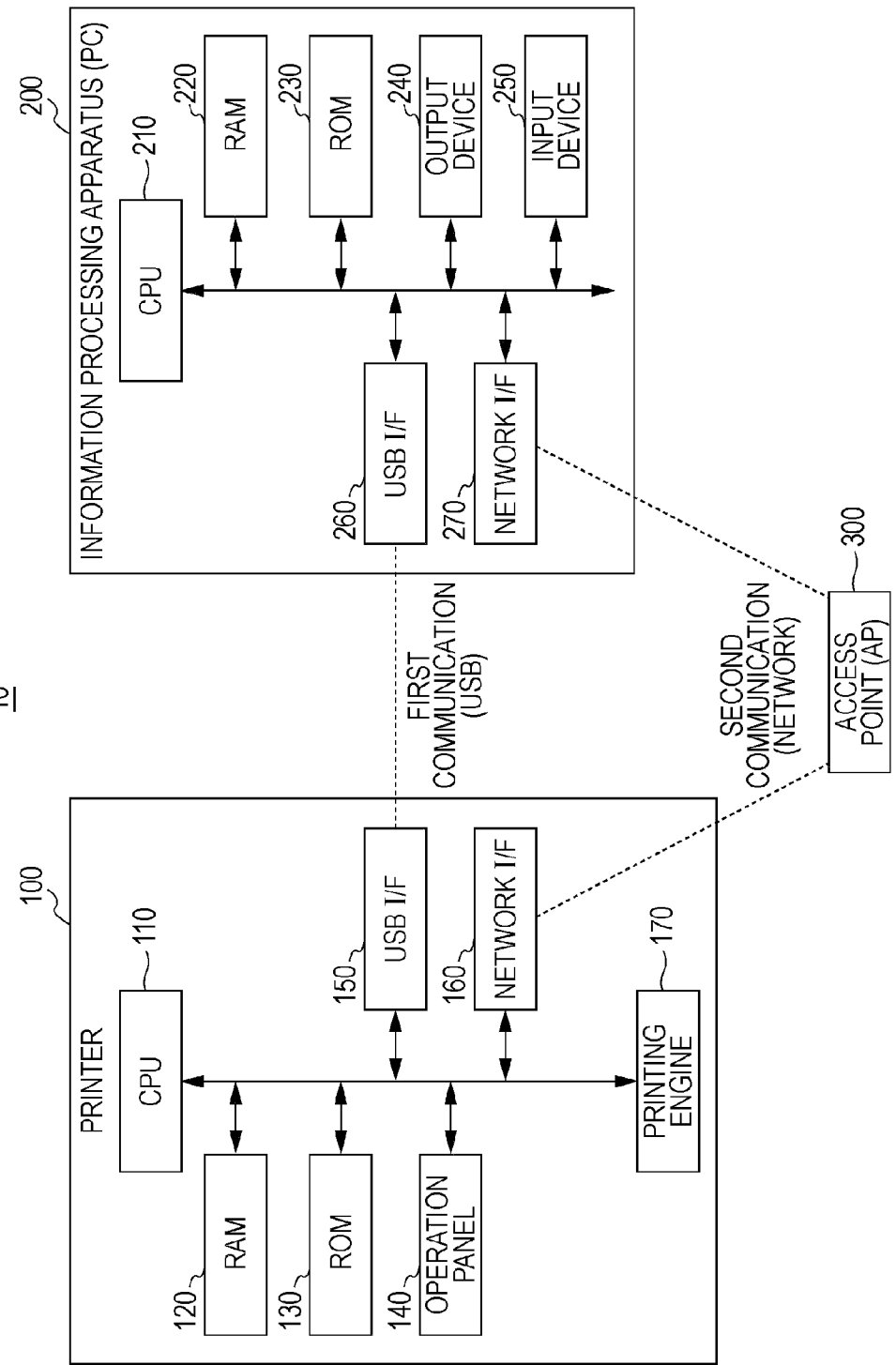

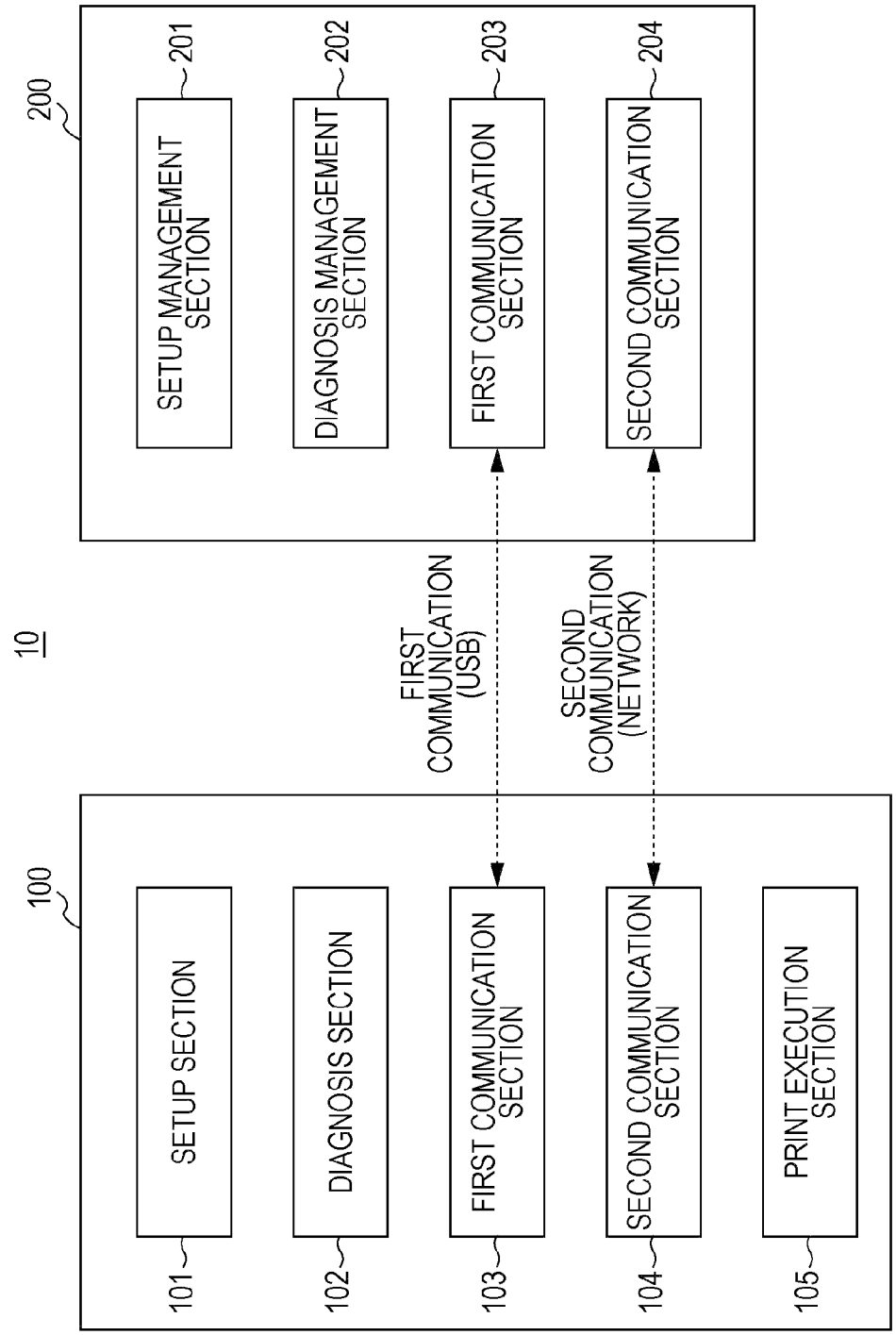

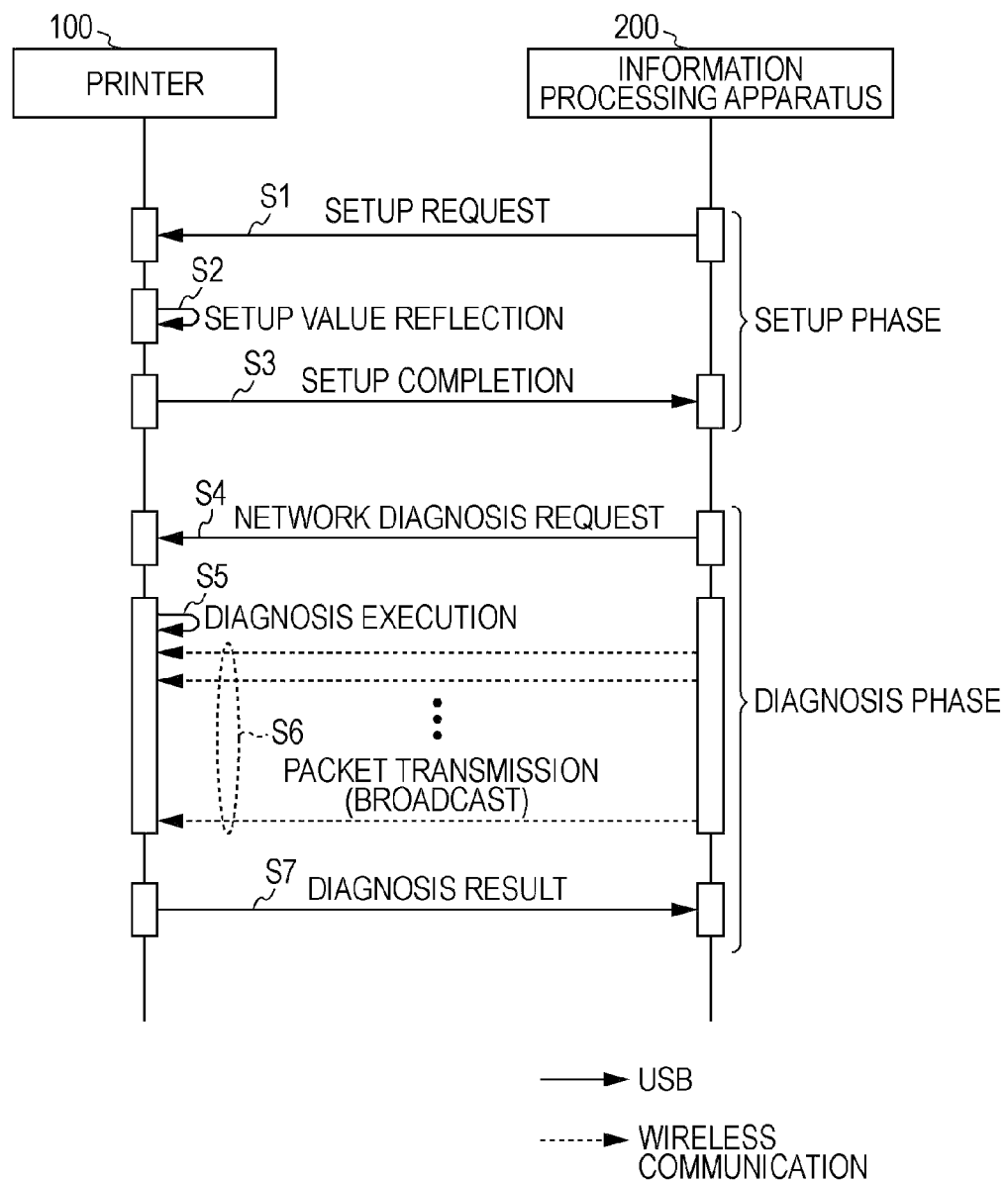

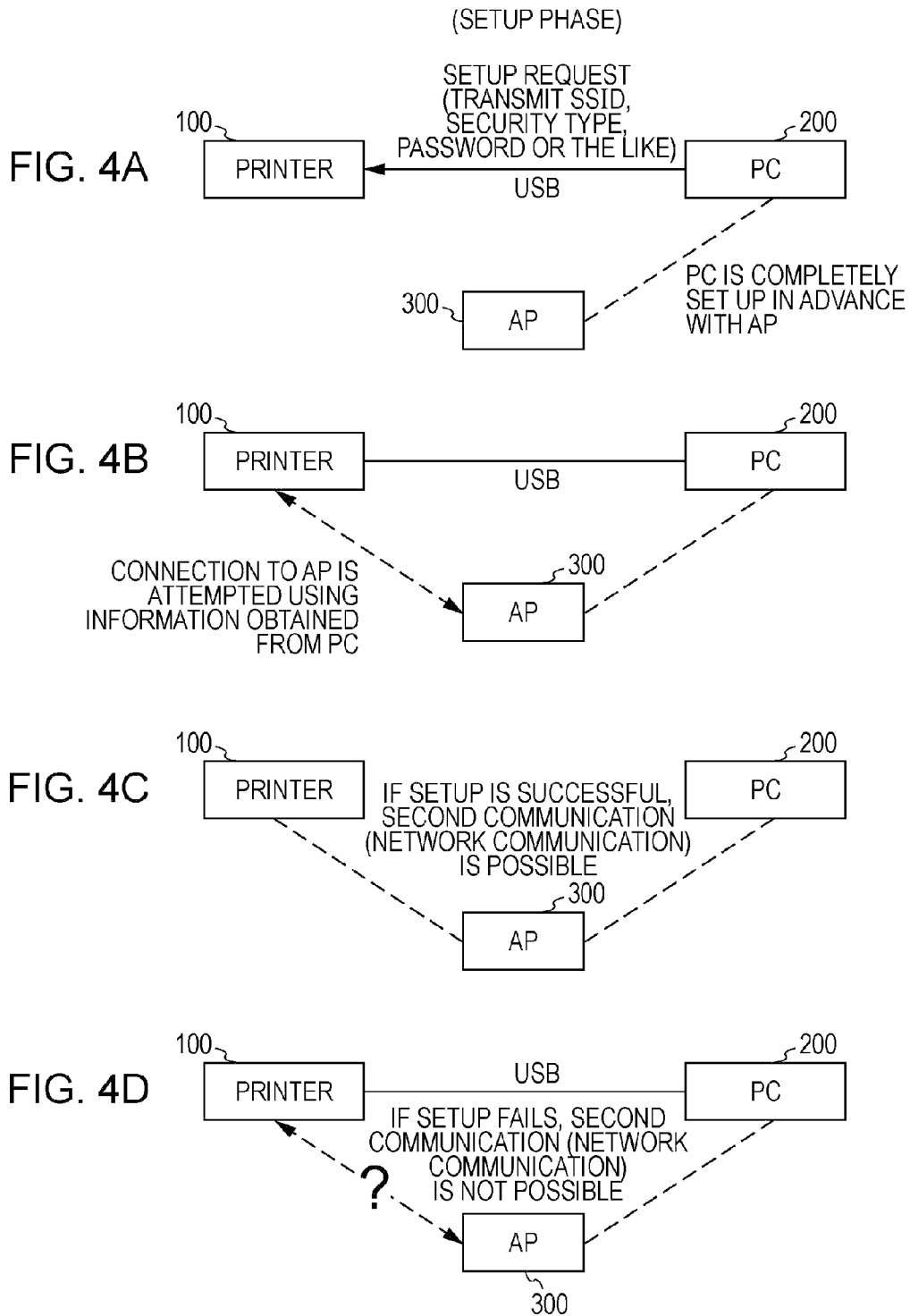

(DIAGNOSIS PHASE)

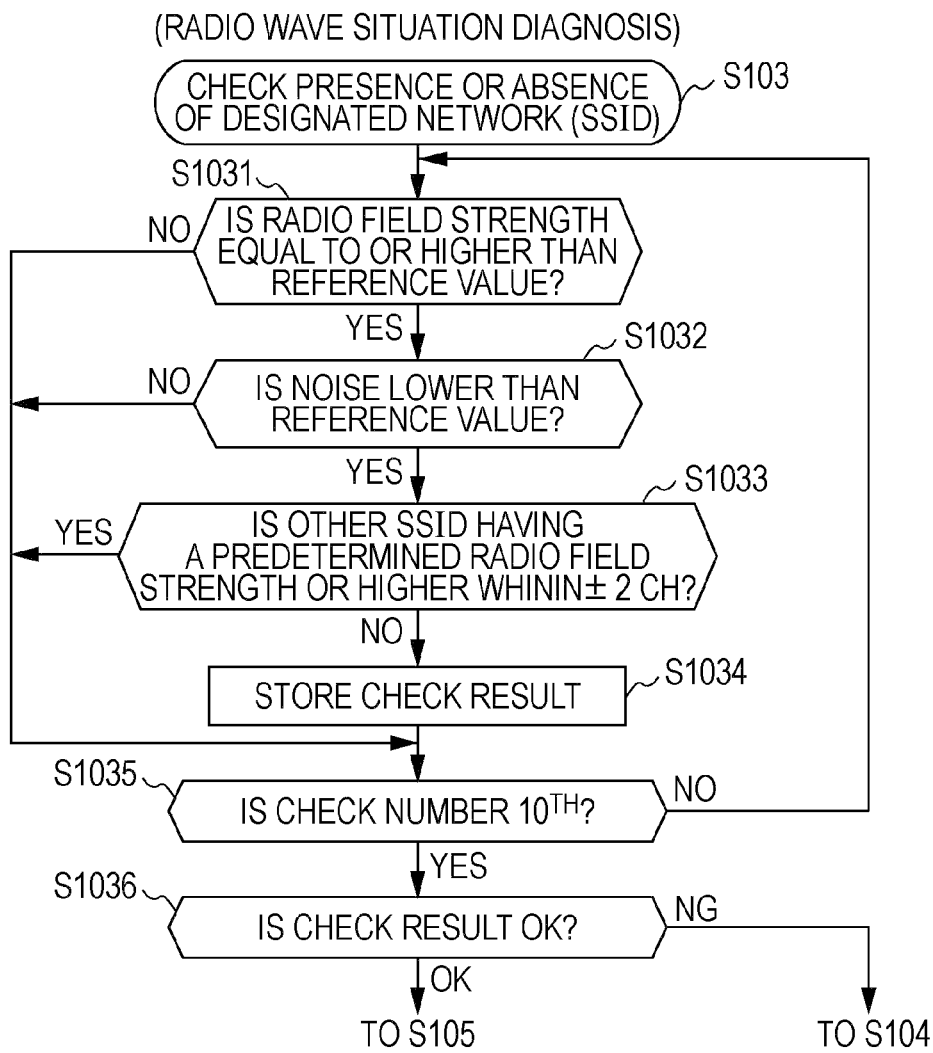

FIG. 9

| NUMBER | SENTENCE |
|---|---|
| 1 | PLEASE CHECK NETWORK CABLE CONNECTION AND POWER OF THE NETWORK DEVICE. |
| 2 | CANNOT FIND A DESIGNATED NETWORK (SSID). PLEASE CHECK POWER AND NETWORK (SSID) OF THE ACCESS POINT. IF YOU HAVE ANY QUESTIONS, PLEASE CONTACT THE AGENT WHO PERFORMED THE NETWORK SETUP. |
| 3 | CANNOT FIND A DESIGNATED NETWORK (SSID). PLEASE CHECK A PERSONAL COMPUTER NETWORK (SSID) TO BE CONNECTED. IF YOU HAVE ANY QUESTIONS, PLEASE CONTACT THE AGENT WHO PERFORMED THE NETWORK SETUP. |
| 4 | THERE IS A POSSIBILITY THAT A DIFFERENT WIRELESS STANDARD IS BEING USED. PLEASE CHECK THAT A WIRELESS STANDARD OF A PRINTER, AN ACCESS POINT AND A PERSONAL COMPUTER ARE SET TO IEEE802.11b/g/n. IF YOU HAVE ANY QUESTIONS, PLEASE CONTACT THE AGENT WHO PERFORMED THE NETWORK SETUP. |
| 5 | PLEASE CHECK THE SECURITY TYPE. IF YOU HAVE ANY QUESTIONS, PLEASE CONTACT THE AGENT WHO PERFORMED THE NETWORK SETUP. |
| 6 | PLEASE LOG IN AS AN ADMINISTRATOR AT THE ACCESS POINT, AND CHECK WHETHER THE MAC ADDRESS FILTERING FUNCTION IS EFFECTIVELY SET. IF IT IS EFFECTIVELY SET, CONNECTION OTHER THAN THE MAC ADDRESS REGISTERED IN ADVANCE IS NOT ALLOWED. IF YOU HAVE ANY QUESTIONS, PLEASE CONTACT THE AGENT WHO PERFORMED THE NETWORK SETUP. |
| 7 | PLEASE CHECK SECURITY KEY. IF YOU HAVE ANY QUESTIONS, PLEASE CONTACT THE AGENT WHO PERFORMED THE NETWORK SETUP. |
| 8 | CANNOT ALLOCATE AN IP ADDRESS. PLEASE CHECK NETWORK DEVICE SETUP. IF YOU HAVE ANY QUESTIONS, PLEASE CONTACT THE AGENT WHO PERFORMED THE NETWORK SETUP. |
| 9 | PLEASE CHECK CONNECTION TO DEVICE FOR USE OF PRINTER AND NETWORK SETUP. IT IS RECOMMENDED TO PERFORM SETUP IN Epson Net SETUP AGAIN. IF YOU HAVE ANY QUESTIONS, PLEASE CONTACT THE AGENT WHO PERFORMED THE NETWORK SETUP. |
| 10 | PLEASE CHECK CONNECTION TO DEVICE FOR USE OF PRINTER AND CHECK SETUP OF AN IP ADDRESS, A SUBNET ADDRESS AND A DEFAULT GATEWAY OF THE PRINTER. IT IS RECOMMENDED TO PERFORM SETUP IN Epson Net SETUP AGAIN. IF YOU HAVE ANY QUESTIONS, PLEASE CONTACT THE AGENT WHO PERFORMED THE NETWORK SETUP. |
| 11 | PLEASE CHECK DEFAULT GATEWAY SETUP OF THE PRINTER. IT IS RECOMMENDED TO PERFORM SETUP IN Epson Net SETUP AGAIN. IF YOU HAVE ANY QUESTIONS, PLEASE CONTACT THE AGENT WHO PERFORMED THE NETWORK SETUP. |
| 12 | PLEASE CHECK THE FOLLOWING.<br>* WHETHER THE SECURITY KEY INPUT OF THE PRINTER IS CORRECT.<br>* IN A CASE WHERE A PLURALITY SECURITY KEYS IS SET UP IN AN ACCESS POINT, WHETHER THE SECURITY KEY OF THE INITIAL (FIRST) INDEX IS SET UP IN THE PRINTER.<br>* WHETHER SETUP OF AN IP ADDRESS, A SUBNET MASK AND A DEFAULT GATEWAY OF THE PRINTER IS CORRECT.<br>IF YOU HAVE ANY QUESTIONS, PLEASE CONTACT THE AGENT WHO PERFORMED THE NETWORK SETUP. |
| 13 | PLEASE CHECK THE FOLLOWING.<br>* WHETHER THE SECURITY KEY INPUT OF THE PRINTER IS CORRECT.<br>* IN A CASE WHERE A PLURALITY SECURITY KEYS IS SET UP IN AN ACCESS POINT, WHETHER THE SECURITY KEY OF THE INITIAL (FIRST) INDEX IS SET UP IN THE PRINTER.<br>* WHETHER CONNECTION TO A DEVICE FOR USE OF THE PRINTER AND NETWORK SETUP ARE CORRECT.<br>IF YOU HAVE ANY QUESTIONS, PLEASE CONTACT THE AGENT WHO PERFORMED THE NETWORK SETUP. |
| 14 | THERE IS A POSSIBILITY THAT A RECEPTION STATE OF RADIO WAVES IS A CAUSE. PLEASE CHECK. |

FIG. 10

| Network Status | |
|---|---|
| Printer Name | EPSOND400EE |
| Printer Model | EP-902A |
| Network Type | Wireless LAN |
| Connection | Disconnected |
| TCP/IP SETUP | Auto |
| IP Address | 0.0.0.0 |
| Subnet Mask | 0.0.0.0 |
| Default Gateway | 0.0.0.0 |
| Network (SSID) | Test_AP |
| Communication Mode | Infrastructure |
| Security | WPA-PSK(TKIP) |
| Signal Strength | Poor |
| MAC Address | 00:00:48:D4:00:EE |
| Check Network Connection | |
| Wireless LAN Check | PASS |
| Communication Mode Check | PASS |
| Security Mode Check | PASS |
| MAC Address Filtering Check | PASS |
| Security Key/Password Check | PASS |
| IP Address Check | FAIL |
| Detailed IP Setup Check | Unchecked |
| DISPLAY COPING PROCESS (SENTENCE) | |

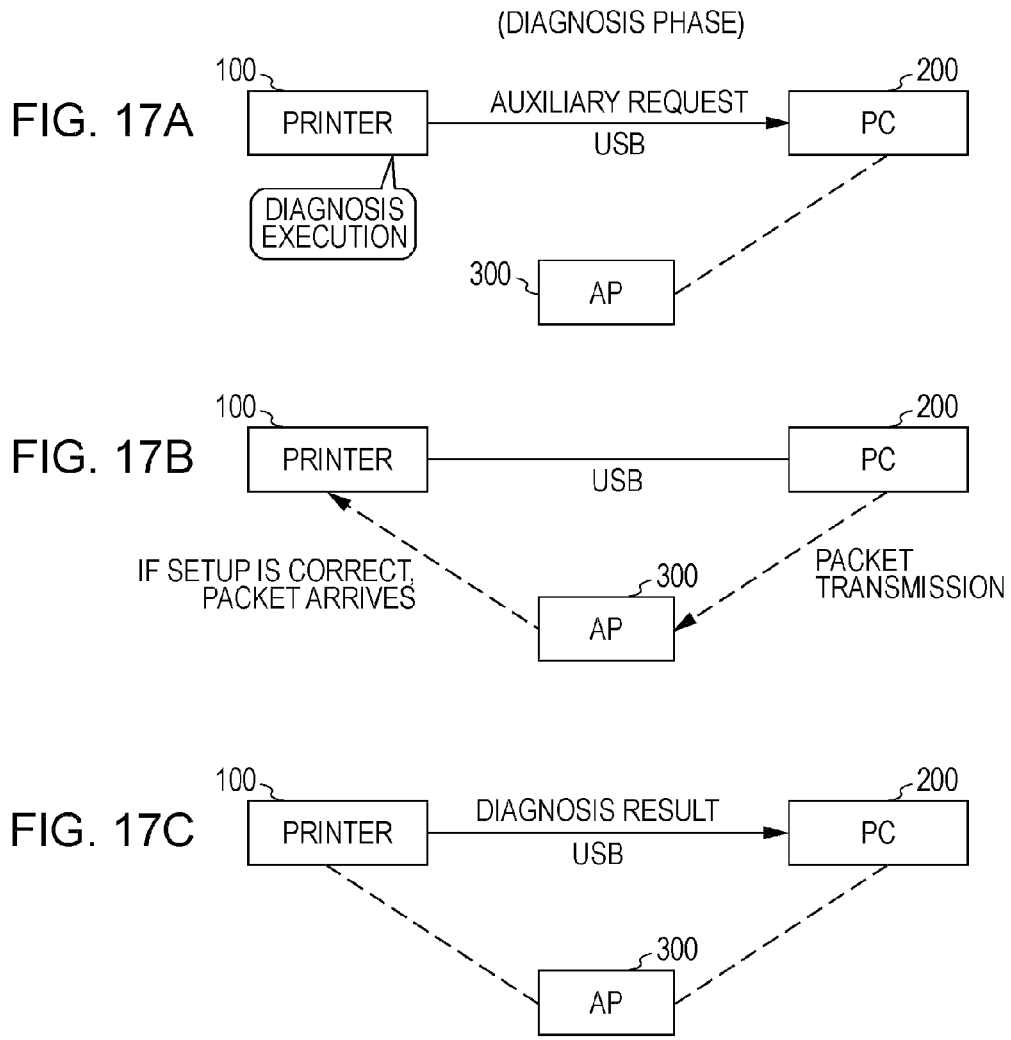

REQUESTING THROUGH WIRED COMMUNICATION A DIAGNOSTIC SIGNAL THROUGH WIRELESS COMMUNICATION

CROSS REFERENCES TO RELATED APPLICATIONS

The entire disclosure of Japanese Patent Application No. 2010-018114, filed Jan. 29, 2010 is incorporated by reference herein.

BACKGROUND

1. Technical Field

The present invention relates to an information processing apparatus, a communication apparatus, a wireless diagnosis apparatus and a program.

2. Related Art

There is a communication device which has a function of carrying out diagnosis through a network connection (JP-A-2009-38665, for example). In a diagnosis method carried out by such a communication device, it is determined whether the communication device can be normally connected to a network in a setup performed by a user. If it is determined that the communication device cannot be connected to the network, a coping process may be presented to the user.

However, in the diagnosis method in the related art, only whether or not a correct IP address is allocated is checked with respect to diagnosis of an IP layer, and thus, even if the IP layer is normally diagnosed, there may actually occur a case where data (for example, a packet) cannot be received, which lowers reliability of the network connection determination.

SUMMARY

An advantage of some aspects of the invention is that it provides a technique which performs diagnosis (determination) with high reliability compared with the related art.

According to an aspect of the invention, there is provided a diagnosis method of diagnosing a first communication method between a first information process apparatus and a second information processing apparatus, the method including: transmitting a diagnosis request to the second information processing apparatus from the first information processing apparatus using a second communication method which is different from the first communication method; transmitting a diagnosis signal to the first information processing apparatus from the second information processing apparatus using the first communication method, according to the reception of the diagnosis request; and determining that communication is possible using the first communication method if a signal received in the first information processing apparatus using the first communication method is the diagnosis signal.

In this way, since it is determined that the communication is possible in a case where the diagnosis signal (data) can be actually received, the reliability becomes high. Further, since the diagnosis request is transmitted in advance using the second communication method which is different from the first communication method, there is no need to transit to a state where diagnosis is constantly possible.

Further, the invention can be also realized as an information processing apparatus, an operation method of an information processing apparatus, a storage medium of a program used in an information processing apparatus, an information processing system, or the like.

BRIEF DESCRIPTION OF THE DRAWINGS

The invention will be described with reference to the accompanying drawings, wherein like numbers reference like elements.

FIG. 1 is a block diagram illustrating an example of a schematic configuration of a printing system according to an embodiment of the invention.

FIG. 2 is a block diagram illustrating an example of a functional configuration of a printing system.

FIG. 3 is a timing chart illustrating an outline of a process performed in a printing system.

FIG. 4A is a diagram illustrating a state of a printing system in step S1.

FIG. 4B is a diagram illustrating a state of a printing system in a case where connection to a network is attempted.

FIG. 4C is a diagram illustrating a state of a printing system in a case where connection to a network is possible.

FIG. 4D is a diagram illustrating a state of a printing system in a case where connection to a network is not possible.

FIG. 7 is a flowchart illustrating a specific process of step S103.

FIG. 8A is a diagram illustrating an example of a schematic data structure of a check result.

FIG. 8B is a diagram illustrating a modification of a schematic data structure of a check result.

FIG. 9 is a diagram illustrating a list of a coping process which is informed to a user.

FIG. 10 is a diagram illustrating an example of an output which informs a user of a coping process.

FIG. 17A is a diagram illustrating a state of a printing system in step S14 according to a second modification.

FIG. 17B is a diagram illustrating a state of a printing system in step S16 according to a second modification.

FIG. 17C is a diagram illustrating a state of a printing system in step S17 according to a second modification.

FIG. 18 is a diagram illustrating an example of a schematic data structure of a radio field intensity determination table.

DESCRIPTION OF EXEMPLARY EMBODIMENTS

Figure 5A:
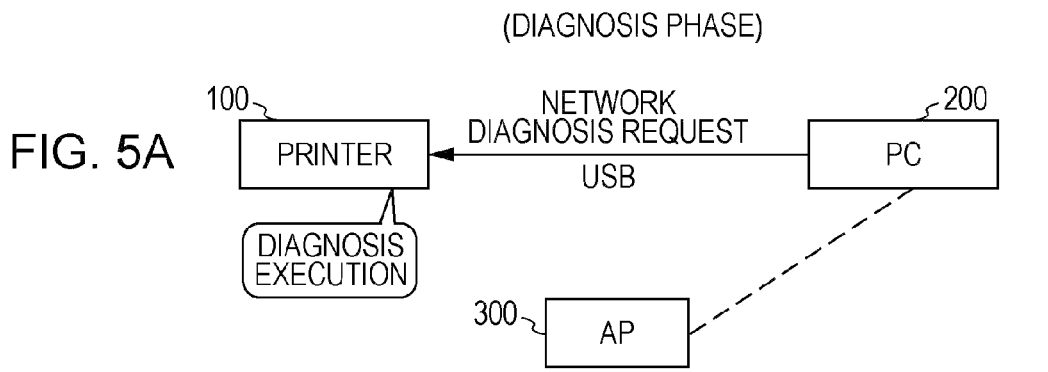
FIG. 5A is a diagram illustrating a state of a printing system in step S4, which is a flowchart illustrating a printing process according to an embodiment of the invention.

Hereinafter, an exemplary embodiment of the invention will be described with reference to the accompanying drawings.

FIG. 1 is a block diagram schematically illustrating an example of a configuration of a printing system 10 according to an embodiment of the invention. As shown in the figure, the printing system 10 includes a printer 100, an information processing apparatus (PC) 200, and an access point (AP) 300. In this embodiment, the information processing apparatus 200 is set up in advance to be able to communicate with the access point 300 in a wireless manner, and a computer network (hereinafter, referred to as a "network") such as a LAN is built between the information processing apparatus 200 and the access point 300. Further, the printer 100 is not connected to the network built between the information processing apparatus 200 and the access point 300, and is able to communicate with the information processing apparatus 200 through a wired cable (for example, a USB cable). The invention relates to a setup for connection (addition) of the printer 100 and the network built between the information processing apparatus 200 and the access point 300, and performs a diagnosis (hereinafter, "network diagnosis") on whether the printer 100 is able to be normally connected to the network.

Printer 100

The printer 100 functions as a printer which performs a general printing process. As shown in the figure, the printer 100 includes a CPU 110, a RAM 120, a ROM 130, a operation panel 140, a USB interface (I/F) 150, a network interface (I/F) 160, and a printing engine 170. A configuration of the printer 100 is not limited thereto.

The CPU 110 is an operational device which controls other units to realize a variety of functions of the printer 100. The CPU 110 realizes a variety of functions by loading a predetermined program stored in a memory such as a ROM 130 to the RAM 120 for execution.

The CPU 110 performs the setup for connection with the network (network built between the information processing apparatus 200 and the access point 300), according to a request (setup request) from the information processing apparatus 200. Further, the CPU 110 performs a network diagnosis according to a request (network diagnosis request) from the information processing apparatus 200, and informs the information processing apparatus 200 of the diagnosis result.

The RAM 120 temporarily stores various programs, data or the like, and is used as a work memory at the time of operation by means of the CPU 110.

The ROM 130 is a rewritable storage medium such as a flash ROM, and stores a variety of programs. For example, the ROM 130 stores a program which performs a setup for connection of the printer 100 and the network, a program which performs a network diagnosis, or the like.

The operation panel 140 includes a liquid crystal display, a touch panel or the like, displays a message or the like, and receives an instruction from a user. For example, the operation panel 140 can display the result of the network diagnosis.

The USB interface 150 controls data reception from or data transmission to the information processing apparatus 200 connected thereto, through the USB cable.

The network interface 160 controls data reception from or data transmission to the access point 300, and communicates with the information processing apparatus 200 through the access point 300.

The printing engine 170 prints data (printing data) on a printing target output from the CPU 110, according to an instruction of the CPU 110.

FIG. 2 is a diagram of a functional configuration of the printing system 10. As shown in the figure, the printer 100 includes a setup section 101, a diagnosis section 102, a first communication section 103, a second communication section 104, and a print execution section 105.

The setup section 101 performs a setup for connection of the printer 100 and the network (network built between the information processing apparatus 200 and the access point 300). For example, if the setup section 101 receives a setup request from the information processing apparatus 200, the setup section 101 performs a setup according to the received setup request and transmits notification of the setup completion to the information processing apparatus 200.

The diagnosis section 102 performs the network diagnosis. For example, if the diagnosis section 102 receives a network diagnosis request from the information processing apparatus 200, the diagnosis section 102 starts the network diagnosis. While performing the network diagnosis, the diagnosis section 102 receives a packet transmitted from the information processing apparatus 200 through the access point 300. Then, the diagnosis section 102 diagnoses whether a normal communication with the access point 300 is possible in the setup performed in the setup section 101, from a status of the printer 100. Then, the diagnosis section 102 informs the information processing apparatus 200 of the diagnosis result. The packet transmitted from the information processing apparatus 200 is a packet for checking the presence of the printer 100.

The first communication section 103 is provided with a wired cable (for example, USB cable) connected thereto, and controls communication with the information processing apparatus through the wired cable. For example, the first communication section 103 controls a USB communication performed by other respective functional sections (the setup section 101, the diagnosis section 102 and the print execution section 105) with respect to the information processing apparatus 200.

The second communication section 104 controls communication with the information processing apparatus 200 through the access point 300. Here, a communication method of the second communication section 104 is a wireless method using radio waves, in at least reception to or transmission from the second communication section 104. The wireless method may be used between the second communication section 104 and the access point 300, and the wired method may be used between the access point 300 and the information processing apparatus 200. The invention is not limited to radio waves, and may use electromagnetic waves having other frequency such as infrared rays. Further, the second communication section 104 controls reception of a predetermined packet broadcast from the information processing apparatus 200, for example.

The print execution section 105 prints printing data (for example, printing data transmitted from the information processing apparatus 200) on the printing target. Specifically, the print execution section 104 controls the printing engine 170 or a printing head (not shown) according to a printing command received together with the printing data, and performs the printing process.

The printer 100 according to the present embodiment has the above-described configuration. However, the configuration of the printer 100 is not limited thereto. For example, the printer 100 may be a multifunction printer having a facsimile function or the like, or a copier having a copy function. The invention may be applied to apparatuses other than a printer.

Further, the above-described respective components are classified according to a main processing content, for easy understanding of the configuration of the printer 100. The invention is not limited to the classification of the components or names thereof. The configuration of the printer 100 may be classified into more components according to the processing content. Further, one component may be classified to perform more processes. Furthermore, the processing of the respective components may be performed using one piece of hardware or plural pieces of hardware.

Information Processing Apparatus 200

Returning to FIG. 1, the information processing apparatus 200 functions as a host computer of the printer 100. As shown in the figure, the information processing apparatus 200 is a general computer including a CPU 210, a RAM 220, a ROM 230, an output device 240, an input device 250 having a keyboard, a mouse or the like, a USB interface (I/F) 260, and a network interface (I/F) 270.

The CPU 210 is an operational device which controls other units to realize a variety of functions of the information processing apparatus 200. The CPU 210 realizes a variety of functions by loading a predetermined program stored in a storage medium such as a ROM 230 or a hard disk (not shown) to the RAM 220 for execution.

For example, the CPU 210 informs the printer 100 of a setup request of a network or a network diagnosis request through a wired cable (for example, USB cable).

The RAM 220 temporarily stores various programs, data or the like, and is used as a work memory at the time of operation by means of the CPU 210.

The ROM 230 is a memory medium such as a flash ROM, and stores a variety of programs. For example, the ROM 230 stores a driver program or the like which controls the printer 100.

The output device 240 includes a liquid crystal display, an organic EL display or the like. A variety of setup screens (for example, network setup screens, print setup screens or the like) are displayed on the output device 240.

The input device 250 includes a keyboard, a mouse or the like. The input device 250 receives an instruction from a user.

The USB interface 260 controls data reception from or data transmission to the printer 100 connected thereto, through a wired cable (for example, a USB cable).

The network interface 270 controls data reception from or data transmission to the access point 300, and performs communication with the printer 100 through the access point 300.

Further, as shown in the functional configuration diagram of FIG. 2, the information processing apparatus 200 includes a setup management section 201, a diagnosis management section 202, a first communication section 203, and a second communication section 204.

The setup management section 201 manages setup content with respect to a network between the setup management section 201 and the access point 300. Further, in a case where the printer 100 is connected (added) to the corresponding network, the setup management section 201 provides the setup content of the corresponding network to the printer 100.

The diagnosis management section 202 manages the network diagnosis performed in the printer 100. For example, the diagnosis management section 202 makes a network diagnosis request to the information processing apparatus 200. Further, the diagnosis management section 202 repeatedly transmits a predetermined packet through the access point 300 in order to check the presence of the printer 100, while the network diagnosis is performed in the printer 100.

The first communication section 203 controls communication with the printer 100 through a wired cable (for example, a USB cable). For example, the first communication section 203 controls a USB communication performed by other respective functional sections (the setup management section 201 and the diagnosis management section 202) with respect to the information processing apparatus 100.

The second communication section 204 controls communication with the printer 100 through the access point 300. Here, communication methods between the second communication section 204 and the access point 300 and between the access point 300 and the printer 100 are all wireless methods using radio waves in this embodiment. The invention is not limited to radio waves, and may use electromagnetic waves of other frequency such as infrared rays. Further, the second communication section 204 controls broadcast of a predetermined packet to the printer 100, for example.

The information processing apparatus 200 according to the present embodiment has the above-described configuration. However, the configuration of the information processing apparatus 200 is not limited thereto. For example, the information processing apparatus 200 may be a mobile terminal such as a mobile phone, a PDA or a games machine.

Further, the respective components are classified according to a main processing content, for ease of understanding of the configuration of the information processing apparatus 200. The invention is not limited by the classification of the components or names thereof. The configuration of the information processing apparatus 200 may be classified into more components according to the processing content. Further, one component may be classified to perform more processes. Furthermore, the processing of the respective components may be performed using one piece of hardware or plural pieces of hardware.

Access Point 300

The access point 300 is a typical access point, and is a radio wave relay which connects the printer 100 with the information processing apparatus 200. The access point 300 may have a router function.

Next, a characteristic operation of the printing system 10 having such a configuration will be described.

Timing Chart (Outline)

FIG. 3 is a timing chart illustrating an outline of a process performed in the printing system 10 according to the present embodiment.

The process performed in the printing system 10 includes a "setup phase" in which a network setup is performed, and a "diagnosis phase" in which a network diagnosis is performed. A solid arrow in the figure represents wired communication through a wired cable (USB cable), and a dashed arrow represents wireless communication through the access point 300.

In the "setup phase", the setup management section 201 of the information processing apparatus 200 makes a network setup request to the printer 100 (step S1).

FIG. 4A is a diagram illustrating a state of the printing system 10 in step S1. As shown in the figure, the setup management section 201 transmits setup request information for a setup request to the printer 100 through a wired cable (for example, a USB cable). Here, the setup request information includes an SSID (service set identifier), a security type, a password, or the like, which are set in the network between the information processing apparatus 200 and the access point 300.

At this time, the setup section 101 of the printer 100 receives the setup request (information) from the setup management section 201 through the first communication section 103.

If the setup section 101 receives the setup request, the setup section 101 performs a process of reflecting a setup value included in the setup request information (step S2). Specifically, the setup section 101 registers the SSID, the security type, password, or the like included in the setup request information received in step S1 in a predetermined storage element (register or the like) as the setup value of the network. In addition, the setup section 101 registers, in a predetermined storage element, a variety of information such as a communication method (infra-structure mode, ad hoc mode, or the like), a wireless mode (for example, IEEE802.11b/g/n or the like), a security method, MAC address filtering, an encryption method (for example, WEP, WPA, or the like), security, a setup method (DHCP setup, auto-IP setup and passive setup), an IP address allocated to a default gateway (access point 300 having a router function), which are set in the network between the access point 300 and the information processing apparatus 200.

Then, the setup section 101 informs the information processing apparatus 200 of the fact that the network setup is completed (step S3). For example, the setup section 101 transmits predetermined data indicating the setup completion to the information processing apparatus 200 through the first communication section 103 and a wired cable (USB cable).

After completion of the process in step S2, the setup section 101 may attempt connection to the network based on the setup value received from the setup management section 201.

FIG. 4B is a diagram illustrating a state of the printing system 10 in a case where the network connection is attempted on the basis of the setup value. As shown in the figure, the printer 100 attempts connection to the access point 300 through wireless communication.

At this time, in a case where the network connection is possible, the procedure goes to step S3 and then the set phase is terminated. Thereafter, the procedure goes to the diagnosis phase in the printing system 10. Here, in the case where the network connection is possible, the diagnosis phase thereafter may not be performed after the setup phase is terminated. FIG. 4C is a diagram illustrating a state of the printing system 10 in a case where the network connection is possible.

Further, in a case where the network connection is not possible, the procedure goes to the diagnosis phase after the process in step S3.

FIG. 4D is a diagram illustrating a state of the printing system 10 in a case where the network connection is not possible. As shown in the figure, in a case where connection to the access point 300 is not possible, the printing system 100 allows the procedure to go to the diagnosis phase in order to provide an appropriate coping process to a user.

Returning to FIG. 3, in the "diagnosis phase", the diagnosis management section 202 of the information processing apparatus 200 makes a network diagnosis request to the printer 100 (step S4).

FIG. 5A is a diagram illustrating a state of the printing system 10 in step S4. As shown in the figure, the diagnosis management section 202 transmits network diagnosis request information for the network diagnosis request to the printer 100 through a wired cable (for example, a USB cable).

At this time, the diagnosis section 102 of the printer 100 receives the network diagnosis request (information) from the information processing apparatus 200 through the first communication section 103.

Further, after the network diagnosis request is made in step S4, the diagnosis management section 202 broadcasts a predetermined packet through the access point 300 (step S6). Then, the diagnosis management section 202 repeatedly performs the process in step S6, until a network diagnosis result is informed from the printer 100 or time runs out.

Figure 5B:
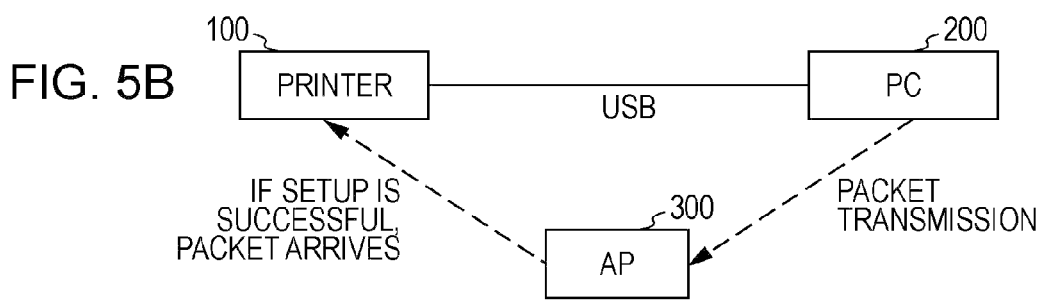
FIG. 5B is a diagram illustrating a state of a printing system in step S6, which is a flowchart illustrating a printing process according to an embodiment of the invention.

FIG. 5B is a diagram illustrating a state of the printing system 10 in step S6. As shown in the figure, if the network setup of the printer 100 is correct, the packet transmitted from the diagnosis management section 202 can be received in the second communication section 104.

On the other hand, if the network diagnosis request is received in step S4, the diagnosis section 102 of the printer 100 performs a network diagnosis (step S5). Here, the diagnosis section 102 determines a reception state of the packet transmitted from the diagnosis management section 202 in step S6, in addition to a physical layer state including a radio wave state or an IP layer state including a setup state of an IP address, and diagnoses whether the printer 100 is normally connected to the network. A further specific process of the network diagnosis will be described later.

If the network diagnosis is terminated, the diagnosis section 102 informs the diagnosis result in step S5 to the information processing apparatus 200 (step S7).

Figure 5C:
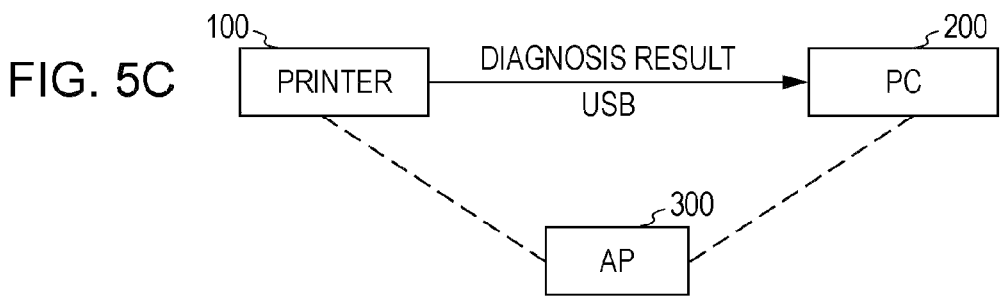
FIG. 5C is a diagram illustrating a state of a printing system in step S7, which is a flowchart illustrating a printing process according to an embodiment of the invention.

FIG. 5C is a diagram illustrating a state of the printing system 10 in step S7. As shown in the figure, the result diagnosed in the diagnosis section 102 of the printer 100 is informed to the information processing apparatus 200 through a wired cable (USB cable). Here, the diagnosis result informed to the information processing apparatus 200 includes a state of radio waves determined (obtained) in step S5, a setup considered as a cause of failure in network connection (item name or the like), and a coping process for enabling the network connection. Hereinafter, details of the coping process will be described later. The diagnosis result diagnosed in the diagnosis section 102 of the printer 100 may be printed by the printer 100.

As described above, in the printing system 10 according to the present embodiment, the processes of the "setup phase" and "diagnosis phase" are performed, so that the network setup and the network diagnosis of the printer 100 can be performed.

Next, the "diagnosis phase" in steps S4 to S7 will be described in detail.

Figure 6:
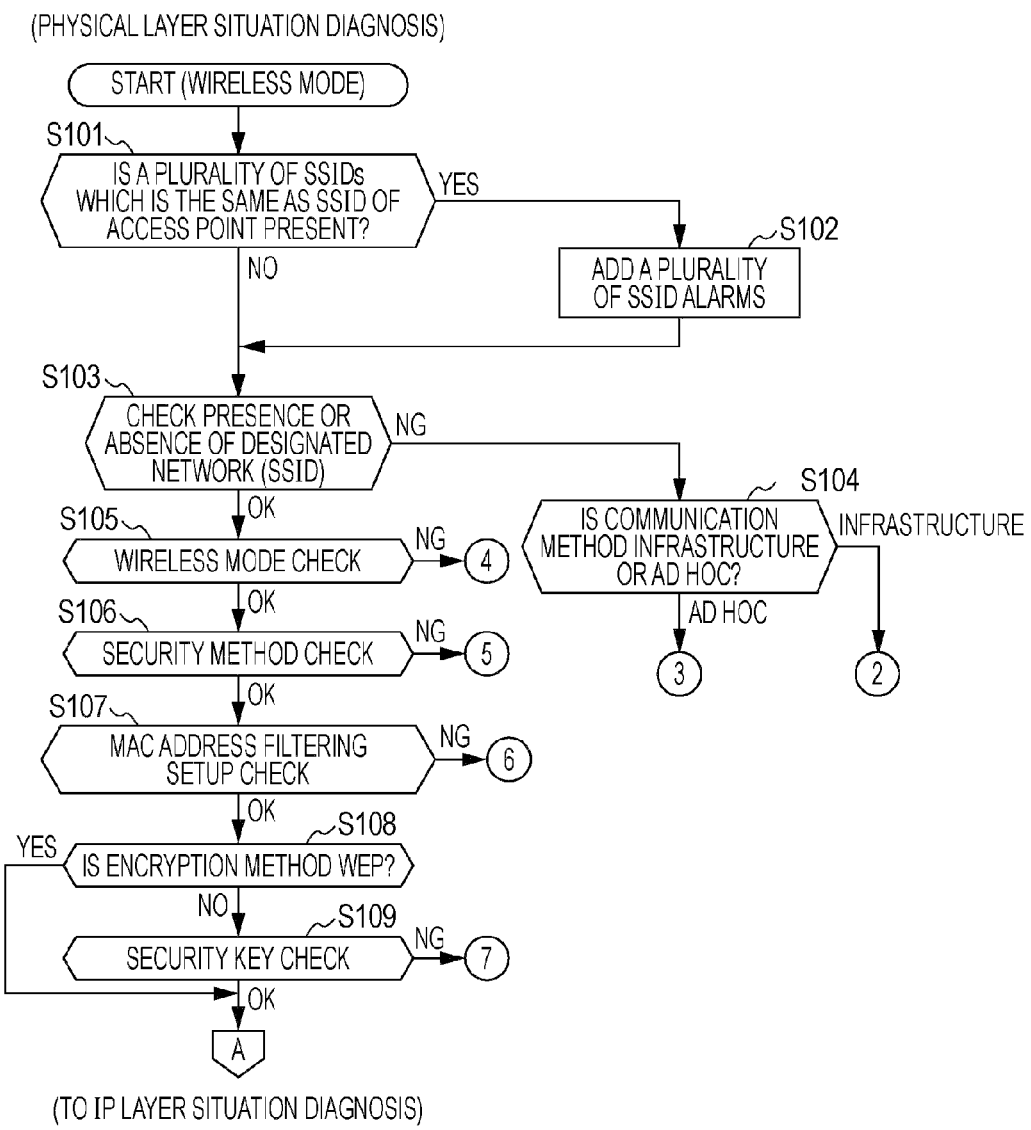
FIG. 6 is a flowchart illustrating a "diagnosis phase" process.

FIG. 6 is a flowchart illustrating a process of the "diagnosis phase" performed in the printer 100 according to the present embodiment.

As described above, if the diagnosis section 102 of the printer 100 receives the network diagnosis request from the diagnosis management section 202, the diagnosis section 102 starts the network diagnosis.

If the network diagnosis is started, the diagnosis section 102 determines whether a plurality of SSIDs which is the same as the SSID of the access point 300 to be connected is present (step S101). Specifically, the diagnosis section 102 reads the SSID registered as the setup value from the predetermined storage element (register or the like), and compares it with an SSID obtained from radio waves (including a beacon output from the access point 300) detected in the network interface (for example, wireless LAN adaptor) 160. At this time, in a case where the plurality of identical SSIDs is present, the diagnosis section 102 determines that the plurality of SSIDs which is the same as the SSID of the access point 300 to be connected is present. On the other hand, in a case where the plurality of identical SSIDs is not present, the diagnosis section 102 determines that the plurality of SSIDs which is the same as the SSID of the access point 300 to be connected is not present.

In the case where the diagnosis section 102 determines that the plurality of SSIDs which is the same as the SSID of the access point 300 to be connected is present (step S101; Yes), the diagnosis section 102 adds data for informing a user of an alarm to the diagnosis result (data) (step S102). Then, the procedure goes to step S103.

On the other hand, in the case where the diagnosis section 102 determines that the plurality of SSIDs which is the same as the SSID of the access point 300 to be connected is not present (step S101; No), the procedure goes to step S103.

If the procedure goes to step S103, the diagnosis section 102 checks the presence or absence of the access point 300 to be connected, and a state of radio waves (step S103).

FIG. 7 is a flowchart illustrating a specific process of step S103 (radio wave state diagnosis phase).

As shown in the figure, if the procedure goes to step S103, firstly, the diagnosis section 102 determines whether the radio field intensity is equal to or higher than a predetermined reference value, with respect to the radio waves output from the access point 300 to be connected (step S1031). Here, the reference value of the radio field intensity is set to a value of a radio field intensity which is sufficient for performing communication between the printer 100 and the access point 300.

If the diagnosis section 102 determines that the radio field intensity is lower than the predetermined reference value (step S1031; No), the procedure goes to step S1035. On the other hand, if the diagnosis section 102 determines that the radio field intensity is equal to or higher than the predetermined reference value (step S1031; Yes), the procedure goes to step S1032.

Then, the diagnosis section 102 determines whether a noise intensity is lower than a predetermined reference value with respect to the radio waves output from the access point 300 to be connected (step S1032). Here, the reference value of the noise intensity is set to be a value of a noise intensity which is sufficient for interrupting communication between the printer 100 and the access point 300.

If the diagnosis section 102 determines that the noise intensity is equal to or higher than the predetermined reference value (step S1032; No), the procedure goes to step S1035. On the other hand, if the diagnosis section 102 determines that the noise intensity is lower than the predetermined reference value (step S1032; Yes), the procedure goes to step S1033.

Then, the diagnosis section 102 determines whether other radio waves (SSID) which have a radio field intensity of a predetermined level or higher and use an adjacent channel (in a predetermined range) are present (step S1033). Here, the radio field intensity of the predetermined level or higher refers to a radio field intensity of the reference value or higher which is used for determination in step S1031, for example. Further, the adjacent channel refers to a channel in ±2 channels with reference to the channel of the radio waves output from the access point 300 to be connected.

If the diagnosis section 102 determines that other radio waves (SSID) are present (step S1033; Yes), the procedure goes to step S1035. On the other hand, if the diagnosis section 102 determines that other radio waves (SSID) are not present (step S1033; No), the procedure goes to step S1034.

Next, the diagnosis section 102 stores the determination (check) results in the steps S1031, S1032 and S1033 in a predetermined memory (for example, RAM 120) (step S1034). Then, the diagnosis section 102 allows the procedure to go to step S1035.

If the procedure goes to step S1035, the diagnosis section 102 determines whether the number of checks reaches a predetermined number (for example, 10 times) (step S1035). Specifically, whenever the procedure goes to step S1035, the diagnosis section 102 increments a predetermined counter value. If the counter value is equal to the predetermined number, the diagnosis section 102 determines that the number of checks reaches the predetermined number. On the other hand, if the counter value is less than the predetermined number, the diagnosis section 102 determines that the number of checks does not reach the predetermined number.

If the diagnosis section 102 determines that the number of checks does not reach the predetermined number (step S1035; No), the procedure returns to step S1031. Thus, the check processes S1031, S1032, and S1033 can be repeated by the predetermined number.

On the other hand, if the diagnosis section 102 determines that the number of checks reaches the predetermined number (step S1035; Yes), the procedure goes to step S1036.

If the procedure goes to step S1036, the diagnosis section 102 determines whether connection to the access point 300 of the printer 100 succeeds or not, on the basis of statistical results of radio wave states obtained in steps S1031, S1032 and S1033 (step S1036). For example, in a case where a total number (OK times), in which a result in step S1031 is Yes, a result in step S1032 is Yes, and a result in step S1033 is No, is equal to or more than a predetermined number (for example, 3 times), the diagnosis section 102 determines that the connection is OK (success). On the other hand, in other cases, the diagnosis section 102 determines that the connection is NG (failure).

FIG. 8A is a diagram illustrating a schematic data structure of a check result 400 used in the determination in step S1036. As shown in the figure, data "3 times" is stored in advance in a check result 400. In step S1036, the diagnosis section 102 compares the total number (OK times), in which a result in step S1031 is Yes, a result in step S1032 is Yes, and a result in step S1033 is No, with the data stored in the check result 400, to thereby perform determination.

The determination method in step S1036 is not limited to the above-described example. For example, the diagnosis section 102 may determine a case where a ratio of the total number (OK times), in which a result in step S1031 is Yes, a result in step S1032 is Yes, and a result in step S1033 is No, is equal to or more than a predetermined ratio (for example, 3/10) as OK (success), and may determine other cases as NG (failure).

FIG. 8B is a diagram illustrating a schematic data structure of the check result 400 used in a case where determination is performed in a determination method of a modification in step S1036. As shown in the figure, data "3/10" is stored in advance in the check result 400. In step S1036, the diagnosis section 102 calculates a ratio of the total number (OK times), in which a result in step S1031 is Yes, a result in step S1032 is Yes, and a result in step S1033 is No, and compares the calculated ratio with the data stored in the check result 400 for determination.

Returning to FIG. 7, if the determination result is OK (success) (in step S1036; OK), the diagnosis section 102 considers that a connectable access point 300 is present, and allows the procedure to go to step S105. On the other hand, if the determination result is NG (failure) (in step S1036; NG), the diagnosis section 102 considers that a connectable access point 300 is not present, and allows the procedure to go to step S104.

Returning to FIG. 6, if the procedure goes to step S104, the diagnosis section 102 determines whether the communication method in the printing system 10 is an intra-structure mode or an ad hoc mode (step S104). For example, the diagnosis section 102 determines whether the communication method is the infra-structure mode or the ad hoc mode using data of identifying a communication method registered by the setup section 101.

If it is determined that the communication method is the ad hoc mode (step S104; ad hoc), the diagnosis section 102 informs the user of a predetermined coping process according to this case.

FIG. 9 is a diagram illustrating a list of a coping process which is informed to the user. As shown in the figure, in step S104, in a case where it is determined that the communication method is the ad hoc mode, sentences corresponding to the number "3", that is, the sentences "cannot find a designated network (SSID)", "please, check a network (SSID) of a personal computer to be connected", "if you have any questions, please contact the agent who performed the network setup" are informed to the user.

Here, in a case where the coping process is informed to the user, the print execution section 104 prints the above described sentences on the basis of an instruction from the diagnosis section 102.

FIG. 10 is a diagram illustrating an output example 500 for informing the user of the coping process. As shown in the figure, the print execution section 104 prints a network status or a diagnosis result (network connection check) on a printing medium and prints the coping process in a predetermined section 510. For example, in step S104, in a case where it is determined the connection method is the ad hoc mode, the sentences corresponding to the number "3" in FIG. 9 are printed in the predetermined section 510. The network status includes information which indicates the radio wave state checked (obtained) in steps S1031 to 1033, and the diagnosis result includes an item name which is considered as a cause of failure in the network connection.

Further, the diagnosis section 102 may print the coping process by the print execution section 104 and display the coping process on the operation panel 140. Further, the diagnosis section 102 may inform the coping process to the information processing apparatus 200 through the wired cable (USB cable), without printing the coping process.

However, in step S104 in FIG. 6, if it is determined that the communication method is the infra-structure mode (step S104; infra), the diagnosis section 102 informs the user of a predetermined coping process according to this case. Specifically, the diagnosis section 102 informs the user of sentences corresponding to the number "2" in FIG. 9, that is, the sentences "cannot find a designated network (SSID)", "please check power and network (SSID) of the access point", "if you have any questions, please contact the agent who performed the network setup".

Further, if the procedure goes to step S105, the diagnosis section 102 checks a wireless mode (step S105). Specifically, the diagnosis section 102 determines whether a wireless standard (for example, IEEE802.11b/g/n) registered by the setup section 101 coincides with a wireless standard of the access pointer 300.

Here, if the wireless standards do not coincide with each other (step S105; NG), the diagnosis section 102 informs the user of a predetermined coping process according to this case. Specifically, the diagnosis section 102 informs the user of sentences corresponding to the number "4" in FIG. 9, that is, the sentences "there is a possibility that a different wireless standard is being used", "please check that a wireless standard of a printer, an access point and a personal computer are set to IEEE802.11b/n/g", "if you have any questions, please contact the agent who performed the network setup".

On the other hand, if the wireless standards coincide with each other (step S105; OK), the diagnosis section 102 allows the procedure to go to step S106.

Then, the diagnosis section 102 checks a security method (step S106). Specifically, the diagnosis section 102 determines whether the security method registered by the setup section 101 is within a specification range of the printer 100.

Here, in a case where the security method is out of the specification range of the printer 100 (step S106; NG), the diagnosis section 102 informs the user of a predetermined coping process according to this case. Specifically, the diagnosis section 102 informs the user of sentences corresponding to the number "5" in FIG. 9, that is, the sentences "please check the security type", "if you have any questions, please contact the agent who performed the network setup".

On the other hand, in a case where the security method is within the specification range of the printer 100 (step S106; OK), the diagnosis section 102 allows the procedure to go to step S107.

Then, the diagnosis section 102 checks a MAC address filtering setup (step S107). Specifically, the diagnosis section 102 determines whether the MAC address of the printer 100 is filtered using information about the MAC address filtering registered by the setup section 101.

Here, if the MAC address of the printer 100 is filtered (step S107; NG), the diagnosis section 102 informs the user of a predetermined coping process according to this case. Specifically, the diagnosis section 102 informs the user of sentences corresponding to the number "6" in FIG. 9, that is, the sentences "please log in as an administrator at the access point, and check whether the MAC address filtering function is effectively set" "if it is effectively set, connection other than the MAC address registered in advance is not allowed", "if you have any questions, please contact the agent who performed the network setup".

On the other hand, if the MAC address of the printer 100 is not filtered (step S107; OK), the diagnosis section 102 allows the procedure to go to step S108.

Then, the diagnosis section 102 determines whether the encryption method registered by the setup section 101 is WEP (step S108). Here, if the encryption method is not the WEP (step S108; No), the diagnosis section 102 allows the procedure to go to step S109.

Further, the diagnosis section 102 checks the security (step S109). Specifically, the diagnosis section 102 determines whether a security mismatch occurs using the security registered by the setup section 101.

Here, if the security mismatch occurs (step S109; NG), the diagnosis section 102 informs the user of a predetermined coping process according to this case. Specifically, the diagnosis section 102 informs the user of sentences corresponding to the number "7" in FIG. 9, that is, the sentences "please, check a security key", "if you have any questions, please contact the agent who performed the network setup".

On the other hand, if the security mismatch does not occur (step S109; OK), the diagnosis section 102 terminates diagnosis of a lower layer (physical layer state) of an IP layer, and allows the procedure to go to step S110 in order to diagnose the IP layer (IP layer state).

Further, if the encryption method is the WEP (step S108; Yes), since it is difficult to determine mismatch of a WEP key due to the specification of the WEP, the diagnosis section 102 terminates the diagnosis of the lower layer of the IP layer without performing a process in step S109, and then allows the procedure to go to step S110 for diagnosis of the IP layer.

Figure 11:
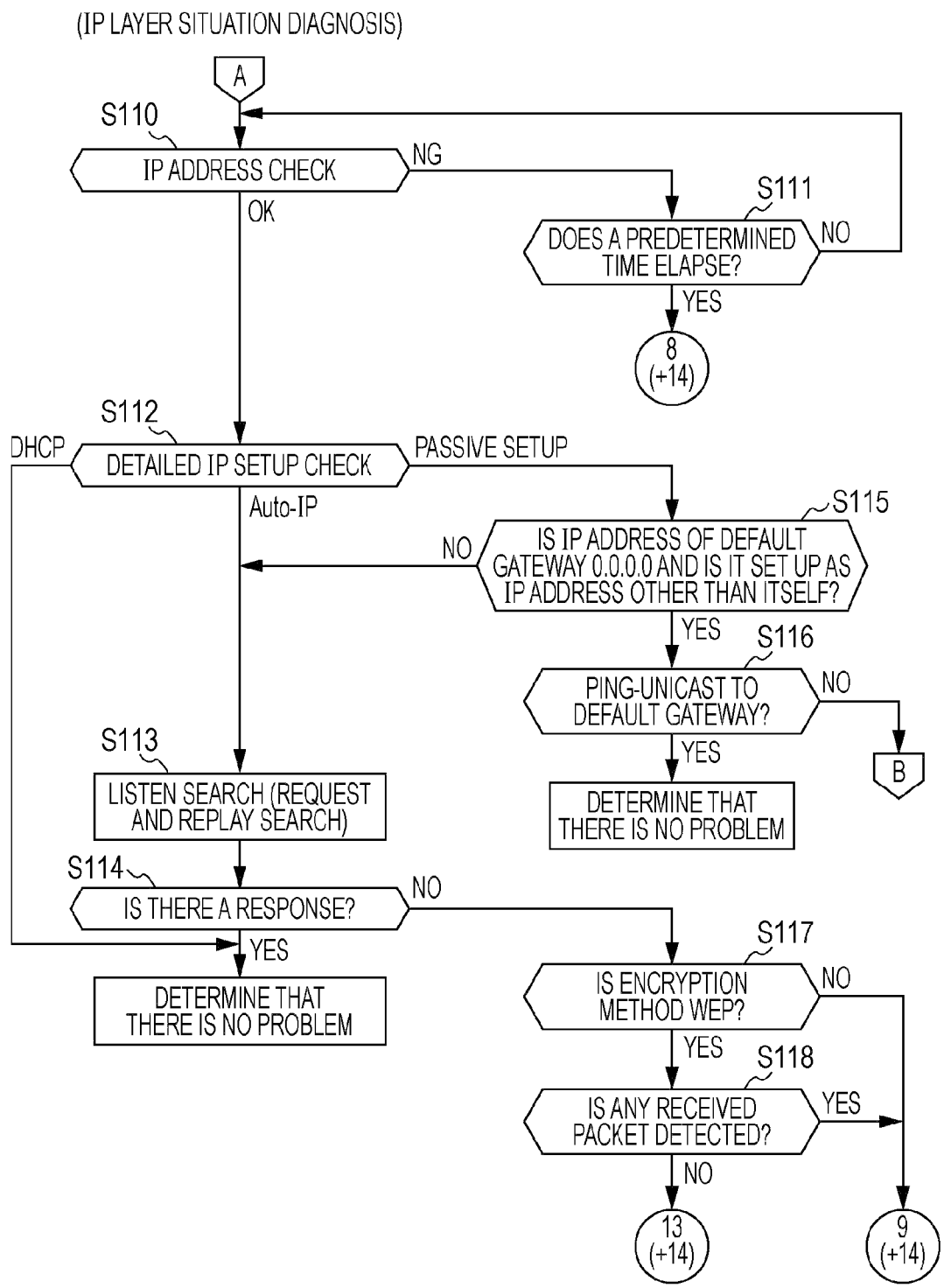
FIG. 11 is a flowchart illustrating a diagnosis process (first half) of an IP layer.

FIG. 11 is a flowchart illustrating a check process (first half) of the IP layer.

As shown in the figure, if the procedure goes to step S110, the diagnosis section 102 checks the IP address (step S110). Specifically, the diagnosis section 102 determines whether an effective IP address is allocated to the printer 100.

Here, if the effective IP address is not allocated to the printer 100 (step S110; NG), the diagnosis section 102 repeats the check in step S110 until the effective IP address is allocated, while a predetermined time does not elapse (step S111; No). Here, in a case where the effective IP address is not allocated even though the predetermined time elapses (step S111; Yes), the diagnosis section 102 informs the user of a predetermined coping process according to this case. Specifically, the diagnosis section 102 informs the user of sentences corresponding to the number "8" in FIG. 9, that is, the sentences "cannot allocate an IP address", "please check the network device setup" "if you have any questions, please contact the agent who performed the network setup".

On the other hand, if the effective IP address is allocated to the printer 100 (step S110; OK), the diagnosis section 102 allows the procedure to go to step S112.

Then, the diagnosis section 102 starts a check process of a detailed setup for the IP address (step S112). Firstly, the diagnosis section 102 determines whether any setup method of a DHCP setup, an auto-IP setup, and a passive setup is designated, with reference to information about a setup method registered in the setup section 101.

Here, if the DHCP setup is designated (step S112; DHCP), since a unique IP address is almost certainly allocated in the same network, the diagnosis section 102 considers that there is no problem in the setup performed in the setup phase, and then terminates this flow.

Further, if the auto-IP setup is designated (step S112; auto-IP), the diagnosis section 102 performs a listen search (passive search) (step S113). Here, the listen search corresponds to the process in step S6. If the diagnosis section 102 receives a predetermined packet broadcast from the check management section 202, the diagnosis section 102 makes a response to the check management section 202 (PING).

At this time, if the diagnosis section 102 receives the packet during a predetermined time (for example, 60 seconds) and can make a response to the check management section 202 (step S114; Yes), the diagnosis section 102 considers that there is no problem in the setup performed in the setup phase, and then terminates this flow.

On the other hand, if the diagnosis section 102 cannot receive the packet during the predetermined time (step S114; No), the procedure goes to step S117.

If the procedure goes to step S117, the diagnosis section 102 determines whether the encryption method registered by the setup section 101 is the WEP (step S117). Here, if the encryption method is the WEP (step S117; Yes), the diagnosis section 102 allows the procedure to go to step S118.

Then, the diagnosis section 102 determines whether any packet is received during the predetermined time in step S114 (step S117). If no packet is received (step S117; No), the diagnosis section 102 informs the user of a predetermined coping process according to this case. Specifically, the diagnosis section 102 informs the user of sentences corresponding to the number "13" in FIG. 9, that is, the sentences "please check the following: whether the security key input of the printer is correct, In a case where a plurality of security keys is set up in the access point, whether a security key of the initial (first) index is set up in the printer, whether connection to a device for use of the printer and network setup are correct", "if you have any questions, please contact the agent who performed the setup".

On the other hand, if the encryption method is not the WEP in step S117 (step S117; No), or if any packet is received in step S118 (step S118; Yes), the diagnosis section 102 informs the user of a predetermined coping process according to this case. Specifically, the diagnosis section 102 informs the user of sentences corresponding to the number "9" in FIG. 9, that is, the sentences "please check connection to a device for use of the printer and network setup", "it is recommended to perform setup in Epson Net Setup again", "if you have any questions, please contact the agent who performed the network setup".

Further, in step S112, if the passive setup is designated (step S112; passive setup), the diagnosis section 102 allows the procedure to go to step S115.

Then, the diagnosis section 102 determines whether an IP address of a default gateway is an IP address which is not uniquely determined (for example, "0.0.0.0"), or an IP address indicating itself (for example, "127.0.0.1") (step S115), with reference to the IP address allocated to the default gateway (access point 300 having the router function) registered in the setup section 101 (step S115).

Here, if the IP address of the default gateway is the IP address which is not uniquely determined or the IP address indicating itself (step S115; Yes), the diagnosis section 102 determines that the IP address allocated to the default gateway is usable, allows the procedure to go to step S113, and then performs the same process as in the above description.

On the other hand, if the IP address of the default gateway is neither the IP address which is not uniquely determined nor the IP address indicating itself (step S115; No), the diagnosis section 102 allows the procedure to go to step S116.

Then, the diagnosis section 102 unicasts the predetermined packet to the default gateway (access point 300) (PING), and checks a network communication with the default gateway (step S116). Specifically, the diagnosis section 102 issues a predetermined IP packet using the IP address allocated to the default gateway as a transmission destination, and determines whether a response from the default gateway (access point 300) is present within a predetermined time.

Here, if the response from the default gateway is present within the predetermined time (step S116; Yes), the diagnosis section 102 considers that there is no problem in the setup in the setup phase, and then terminates this flow.

On the other hand, if the response from the default gateway is not present within the predetermined time (step S116; No), the diagnosis section 102 allows the procedure to go to step S119.

Figure 12:
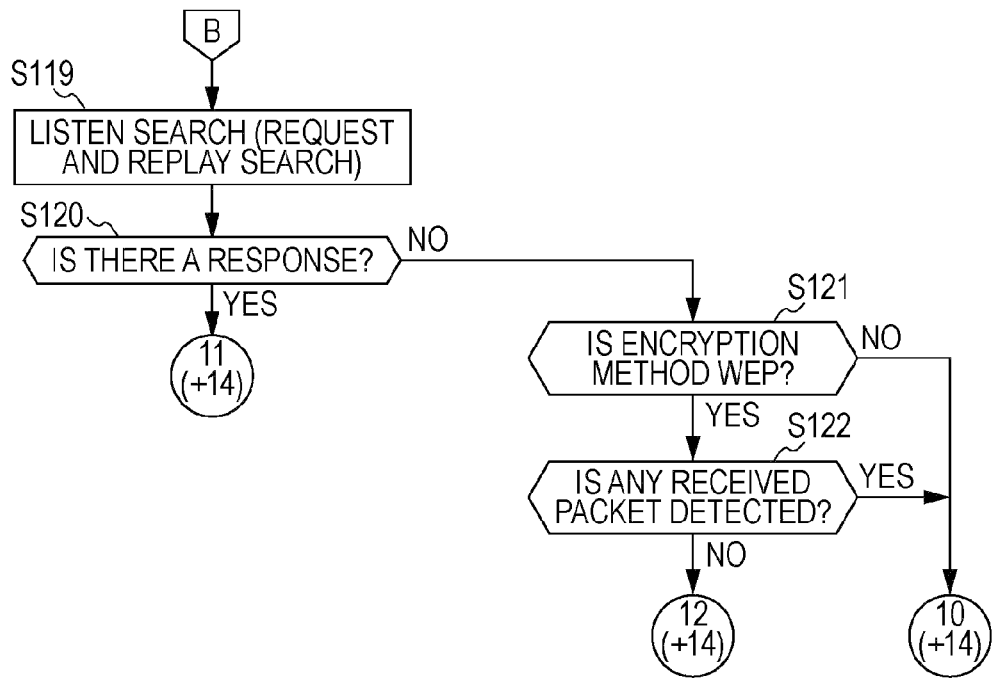
FIG. 12 is a flowchart illustrating a diagnosis process (second half) of an IP layer.

FIG. 12 is a flowchart illustrating a diagnosis process (second half) of the IP layer.

As shown in the figure, if the procedure goes to step S119, the diagnosis section 102 performs the same listen search (passive search) as in step S113 (step S119).

At this time, the diagnosis section 102 receives the packet during a predetermined time (for example, 60 seconds), and can make a response to the information processing apparatus 200 (step S120; Yes), the diagnosis section 102 informs the user of a predetermined coping process according to this case. Specifically, the diagnosis section 102 informs the user of sentences corresponding to the number "11" in FIG. 9, that is, the sentences "please check default gateway setup of the printer" "it is recommended to perform setup in Epson Net Setup again", "if you have any questions, please contact the agent who performed the setup."

On the other hand, if the diagnosis section 102 cannot receive the packet during the predetermined time (step S120; No), the procedure goes to step S121.

If the procedure goes to step S121, the diagnosis section 102 determines whether the encryption method registered by the setup section 101 is the WEP (step S121). Here, if the encryption method is the WEP (step S121; Yes), the diagnosis section 102 allows the procedure to go to step S122.

Then, the diagnosis section 102 determines whether any packet is received during the predetermined time in step S120 (step S122). Further, if any packet is not received (step S122; No), the diagnosis section 102 informs the user of a predetermined coping process according to this case. Specifically, the diagnosis section 102 informs the user of sentences corresponding to the number "12" in FIG. 9, that is, the sentences "please check the following: whether the security key input of the printer is correct, in a case where a plurality of security keys is set up in the access point, whether a security key of the initial (first) index is set up in the printer, whether setup of an IP address, a subnet mask and a default gateway of the printer is correct", "if you have any questions, please contact the agent who performed the setup".

On the other hand, if the encryption method is not the WEP in step S121 (step S121; No), or if any packet is received in step S122 (step S122; Yes), the diagnosis section 102 informs the user of a predetermined coping process according to this case. Specifically, the diagnosis section 102 informs the user of sentences corresponding to the number "10" in FIG. 9, that is, the sentences "please check connection to a device for use of the printer and check setup of an IP address, a subnet address and a default gateway of the printer", "it is recommended to perform setup in Epson Net Setup again" "if you have any questions, please contact the agent who performed the network setup".

After the coping processes at the respective timings (timings corresponding to flow numbers "2" to "13") are informed to the user (that is, after the diagnosis result is informed to the user (step S7)), the diagnosis section 102 terminates this flow.

Through the above-described processes, it is possible to perform a network diagnosis with higher reliability compared with the related art, and to provide a technique of presenting an appropriate coping process to the user.

Each processing unit of the above-described each flow is obtained by dividing the printing system 10 according to main processing contents, for ease of understanding thereof. The invention is not limited according to the classification of the processing steps or their names. The processes performed by the printing system 10 can be divided into more processing steps. Further, one processing step may include more processes.

Further, the above-described embodiment is desired to exemplify a summary of the invention, but the invention is not limited thereto. Many alternatives, changes, modifications are obvious to those skilled in the art.

First modification

For example, in the above-described embodiment, the printer 100 is connected (added) to the network using wireless communication through the access point 300. However, the invention is not limited thereto, and the printer 100 may be connected (added) to the network using wired communication through a network cable (for example, a LAN cable).

In this case, the network interface 160 of the printer 100 is provided with the network cable connected thereto. Then, the network interface 160 performs data reception from or transmission to the access point 300 through the network cable.

Further, the network interface 270 of the information processing apparatus 200 is provided with the network cable connected thereto. Then, the network interface 270 performs data reception from or transmission to the access point 300 through the network cable. Here, the network interface 270 of the information processing apparatus 200 may perform data reception from or transmission to the access point 300 through wireless communication, in a similar way to the above-described embodiment.

Further, the second communication section 104 of the printer 100 controls communication with the access point 300 through the network cable. For example, the second communication section 104 controls reception or the like of the predetermined packet broadcast from the information processing apparatus 200. Further, the second communication section 204 of the information processing apparatus 200 controls communication with the access point 300 through the network cable (or radio waves).

Figure 13:
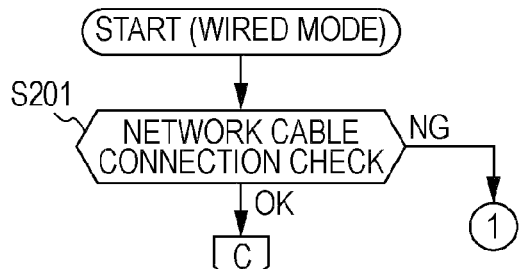
FIG. 13 is a flowchart illustrating a "diagnosis phase" process according to a first modification.

FIG. 13 is a flowchart illustrating a "diagnosis phase" process performed by the printer 100, in a case where the printer 100 is connected (added) to the network by wired communication.

As shown in the figure, if the diagnosis section 102 of the printer 100 receives a network check request from the diagnosis management section 202, the diagnosis section 102 starts the network diagnosis.

If the network check starts, the diagnosis section 102 checks connection of the network cable which is connected to the network interface 160 (step S201). Specifically, the diagnosis section 102 determines whether a physical signal supplied to the network interface 160 from the access point 300 is in a link state.

Here, if the physical signal supplied to the network interface 160 is not in the link state (step S201; NG), the diagnosis section 102 informs the user of a predetermined coping process according to this case. Specifically, the diagnosis section 102 informs the user of the sentences corresponding to the number "1" in FIG. 9, that is, the sentences "please, check network cable connection and power of the network device".

On the other hand, if the physical signal supplied to the network interface 160 is in the link state (step S201; OK), the diagnosis section 102 terminates diagnosis of the physical layer state, and then the procedure goes to step S202.

Figure 14:
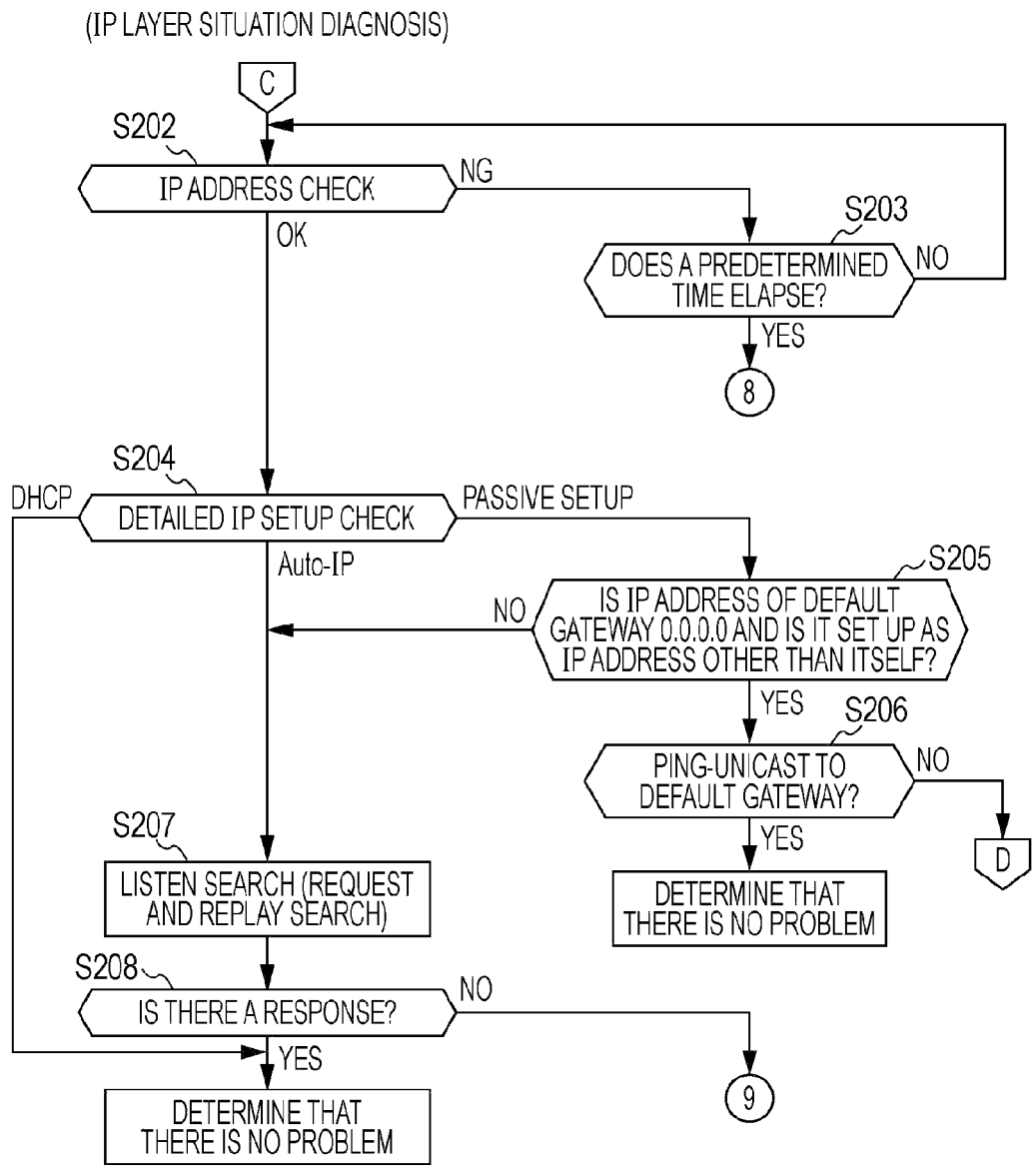
FIG. 14 is a flowchart illustrating a diagnosis process (first half) of an IP layer according to a first modification.

FIG. 14 is a flowchart illustrating a diagnosis process (first half) of the IP layer in a case where the printer 100 is connected (added) to the network by wired communication.

As shown in the figure, if the procedure goes to step S202, the IP address is checked (step S202). Specifically, the diagnosis section 102 determines whether an effective IP address is allocated to the printer 100.

Here, if the effective IP address is allocated to the printer 100 (step S202; NG), the diagnosis section 102 repeatedly performs the check of step S202 until the effective IP address is allocated during the predetermined time does not elapse (step S203; No). Here, the effective IP address is not allocated even though the predetermined time elapses (step S202; Yes), the diagnosis section 102 informs the user of a predetermined coping process according to this case. Specifically, the diagnosis section 102 informs the user of sentences corresponding to the number "8" in FIG. 9, that is, the sentences "cannot allocate an IP address", "please check the network device setup", "if you have any questions, please contact the agent who performed the network setup".

On the other hand, if the effective IP address is allocated to the printer 100 (step S202; OK), the diagnosis section 102 allows the procedure to go to step S204.

Then, the diagnosis section 102 starts a check process of a detailed setup with respect to the IP address (step S204). Firstly, the diagnosis section 102 determines whether any setup method of a DHCP setup, an auto-IP setup and a passive setup is designated, with reference to information about a setup method registered in the setup section 101.

Here, if the DHCP setup is designated (step S204; DHCP), since a unique IP address is almost certainly allocated within the same network, the diagnosis section 102 considers that there is no problem in the setup performed in the above-described setup phase, and then terminates this flow.

Further, if the auto-IP setup is designated (step S204; auto-IP), the diagnosis section 102 performs the listen search (passive search) (step S207).

At this time, if the diagnosis section 102 receives the packet broadcast from the check management section 202 during a predetermined time (for example, 60 seconds) and can make a response to the check management section 202 (step S208; Yes), the diagnosis section 102 considers that there is no problem in the setup performed in the setup phase, and then terminates this flow.

On the other hand, if the packet cannot be received during the predetermined time (step S208; No), the diagnosis section 102 informs the user of a predetermined coping process according to this case. Specifically, the diagnosis section 102 informs the user of the sentences corresponding to the number "9" shown in FIG. 9, that is, the sentences "please check connection to a device for use of the printer and network setup", "it is recommended to perform setup in Epson Net Setup again", "if you have any questions, please contact the agent who performed the network setup".

Further, if the passive setup is designated in step S204 (step S204; passive setup), the diagnosis section 102 allows the procedure to go to step S205.

Then, the diagnosis section 102 determines whether the default gateway IP address is an IP address which is not uniquely determined (for example, "0.0.0.0"), or an IP address indicating itself (for example, "127.0.0.1"), with reference to the IP address allocated to the default gateway (access point 300 having the router function) registered in the setup section 101 (step S205).

Here, if the IP address of the default gateway is the IP address which is not uniquely determined or the IP address indicating itself (step S205; Yes), the diagnosis section 102 determines that the IP address allocated to the default gateway is usable, allows the procedure to go to step S207, and then performs the same process as described above.

On the other hand, if the IP address of the default gateway is neither the IP address which is not uniquely determined, nor the IP address indicating itself (step S205; No), the diagnosis section 102 allows the procedure to go to step S206.

Then, the diagnosis section 102 unicasts a predetermined packet to the default gateway (access point 300) (PING), and checks a network communication with the default gateway (step S206). Specifically, the diagnosis section 102 issues a predetermined IP packet using the IP address allocated to the default gateway as a transmission destination, and determines whether a response from the default gateway (access point 300) is present within a predetermined time.

Here, if the response from the default gateway is present within the predetermined time (step S206; Yes), the diagnosis section 102 considers that there is no problem in the setup performed in the setup phase according to the embodiment, and then terminates this flow.

On the other hand, if the response from the default gateway is not present within the predetermined time (step S206; No), the diagnosis section 102 allows the procedure to go to step S209.

Figure 15:
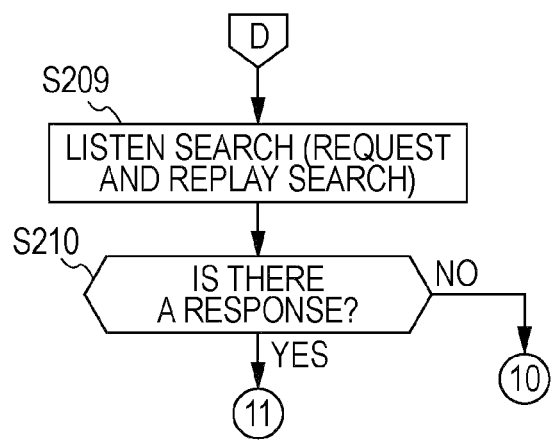
FIG. 15 is a flowchart illustrating a diagnosis process (second half) of an IP layer according to a first modification.

FIG. 15 is a flowchart illustrating a diagnosis process (second half) of the IP layer, in a case where the printer 100 is connected (added) to the network by wired communication.

As shown in the figure, if the procedure goes to step S209, the diagnosis section 102 performs the same listen search (passive search) as in step S207 (step S209).

At this time, if the diagnosis section 102 receives a predetermined packet broadcast from the check management section 202 during a predetermined time (for example, 60 seconds) and can make a response to the information processing apparatus 200 (step S210; Yes), the diagnosis section 102 informs the user of a predetermined coping process according to this case. Specifically, the diagnosis section 102 informs the user of sentences corresponding to the number "11" in FIG. 9, that is, the sentences "please check default gateway setup of the printer", "it is recommended to perform setup in Epson Net Setup again", "if you have any questions, please contact the agent who performed the setup."

On the other hand, if the diagnosis section 102 cannot receive the packet during the predetermined time (step S210; No), the diagnosis section 102 inform the user of a predetermined coping process according to this case. Specifically, the diagnosis section 102 informs the user of the sentences corresponding to the number "10" in FIG. 9, that is, the sentences "please check connection to a device for use of the printer and check setup of an IP address, a subnet address and a default gateway of the printer", "it is recommended to perform setup in Epson Net Setup again", "if you have any questions, please contact the agent who performed the network setup".

As described above, in the first modification, in a case where the printing section 100 is connected (added) to the network using wired communication though the network cable (for example, LAN cable), it is possible to perform a network diagnosis with higher reliability compared with in the related art, and also to present a more appropriate coping process to the user.

Second Modification

Further, in the above-described embodiment and the first modification, the network check request (S4) is transmitted to the printer 100 from the information processing apparatus 200, and then, the check management section 202 of the information processing apparatus 200 broadcasts the predetermined packet to the printer 100. However, the invention is not limited thereto, a request (hereinafter, referred to as "auxiliary diagnosis request" may be transmitted to the information processing apparatus 200 from the printer 100 so as to broadcast the predetermined packet.

Figure 16:
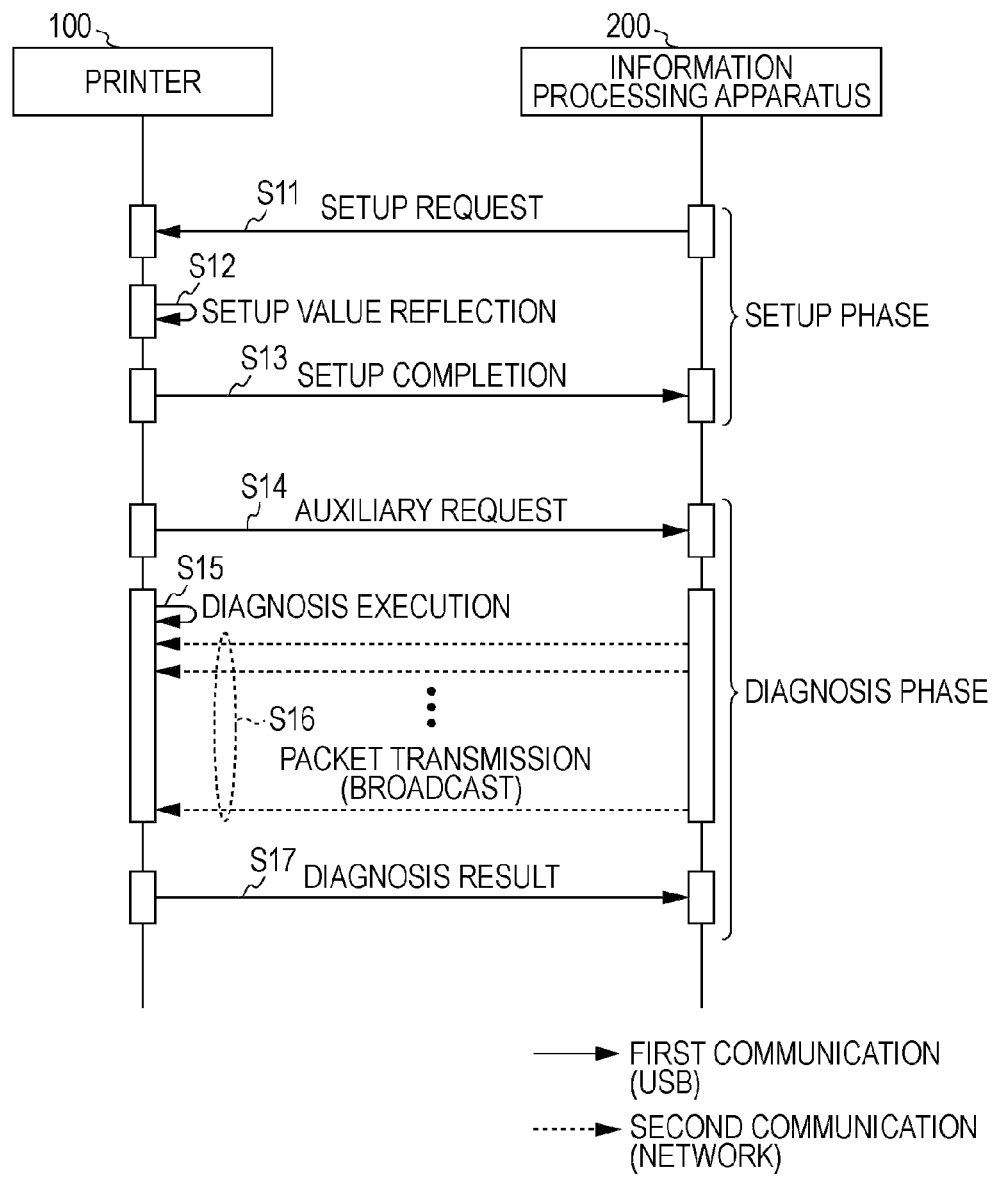
FIG. 16 is a timing chart illustrating an outline of a process performed in a printing system according to a second modification, which illustrates an example of a schematic data structure of printer information.

FIG. 16 is a timing chart illustrating an outline of a process performed in the printing system 10 in a case where the auxiliary diagnosis request is transmitted to the information processing apparatus 200 from the printer 100.

As shown in the figure, after the same "setup phase (steps S11 to S13)" as in the above-described embodiment and the first modification is terminated, the check section 202 of the printer 100 makes the auxiliary diagnosis request to the information processing apparatus 200 (step S14).

FIG. 17A is a diagram illustrating a state of the printing system 10 in step S14. As shown in the figure, the check section 202 transmits auxiliary diagnosis information for the auxiliary diagnosis request to the information processing apparatus 200, through a wired cable (USB cable). Here, the auxiliary diagnosis request information includes an IP address allocated to the printer 100 or the like.

At this time, the check management section 202 of the information processing apparatus 200 receives the auxiliary diagnosis request (information) from the printer 100 through the first communication section 203.

Then, if the auxiliary diagnosis request is received in step S14, the check management section 202 broadcasts the predetermined packet through the access point 300 (step S16). Then, the check management section 202 repeatedly performs the process of step S16 until the network diagnosis result is informed from the printer 100. In step S16, the check management section 202 may unicast the predetermined packet with respect to the IP address of the printer 100 included in the auxiliary diagnosis request, instead of the broadcast of the predetermined packet.

FIG. 17B is a diagram illustrating a state of the printing system 10 in step S16. As shown in the figure, if the network setup of the printer 100 is correct, the packet transmitted from the check management section 202 can be received in the second communication section 104.

On the other hand, after the auxiliary diagnosis request is made in step S14, the diagnosis section 102 of the printer 100 performs the network diagnosis (step S15). Here, the diagnosis section 102 determines a reception state of the packet transmitted from the diagnosis management section 202 in step S16, in addition to a physical layer state including a radio wave state or an IP layer state including a setup state of an IP address, and diagnoses whether the printer 100 is normally connected to the network.

If the network diagnosis is terminated, the diagnosis section 102 informs the information processing apparatus 200 of the diagnosis result in step S15 (step S17).

FIG. 17C is a diagram illustrating a state of the printing system 10 in step S17. As shown in the figure, the diagnosis result in the diagnosis section 102 of the printer 100 is informed to the information processing apparatus 200 through the wired cable (USB cable). Here, the diagnosis result informed to the information processing apparatus 200 includes a coping process for enabling the network connection, in a similar way to the above-described embodiment and the first modification. Further, in a similar way to the above-described embodiment and the first modification, the diagnosis result in the diagnosis section 102 of the printer 100 may be printed by the printer 100.

As described above, in the printing system 10 according to the second modification, the processes of the "setup phase" and the "diagnosis phase" are performed, and the network setup and the network diagnosis of the printer 100 can be performed.

Then, in the second modification, the processes of step S113 and step S119 according to the embodiment are different from each other. Further, similarly, in the second modification, the processes of step S207 and step S209 according to the first modification are different from each other.

Specifically, in the second modification, in steps S113, S119, S207 and S209, a request and replay search (active search) is performed instead of the listen search. Here, the request and replay search corresponds to the processes of step S14 and S16. The diagnosis section 102 makes the auxiliary diagnosis request to the information processing apparatus 200, and waits for a predetermined packet broadcast from the check management section 202 according to the request. Further, if the diagnosis section 102 receives the packet, the diagnosis section 102 makes a response to the check management section 202 (PING).

As described above, in the second modification, the printer 100 can request (auxiliary diagnosis request) broadcast (or unicast) of the predetermined packet to the information processing apparatus 200, without waiting for the network diagnosis request from the information processing apparatus 200.

Third Modification

Further, in the above-described embodiment, the first modification and the second modification, in the check process (step S103) of the radio wave state shown in FIG. 7, the respective check processes (steps S1031 to S1033) are necessarily repeated by a predetermined time (10 times). However, the invention is not limited thereto. For example, in initial (first) respective check processes (steps S1031 to S1033), in a case where the radio field strength checked in step S1031 exceeds a predetermined reference value (for example, a value higher than the reference value described in the above-described embodiment), respective check processes of the second time and thereafter are not performed, and then the procedure goes to step S1036. Then, it may be determined that the check result is OK (success). On the other hand, in the initial (first) respective check processes (steps S1031 to S1033), if the radio field strength checked in step S1031 does not exceed the predetermined reference value (for example, a value higher than the reference value described in the above-described embodiment), the respective check processes are repeated by a predetermined number of times (10 times).

Accordingly, when the radio wave state is obviously good, it is possible to omit an unnecessary repetitive process, and to perform a network diagnosis process at high speed.

Fourth Modification

Further, in the above-described embodiment and the second and third modifications, in the diagnosis process (at the time of carrying out the flow in FIGS. 11 and 12) of the IP layer, a coping process (corresponding to numbers "8" to "13" in FIG. 9) relating to the IP address setup is informed to the user. However, the invention is not limited thereto. For example, even in the check process of the IP layer, the information which indicates the radio wave state and a coping process suggesting a possibility that there is a problem in the radio wave state, in addition to a coping process relating to the IP address setup (IP layer state), may be informed to the user.
First Informing Method Specifically, the diagnosis section 102 informs the user of a sentence corresponding to the number "14" in FIG. 9 (that is, "there is a possibility that a reception state of radio waves is a cause, please check"), at the timings when the coping processes relating to the IP address setup (numbers "8" to "13" in FIG. 9) are informed to the user.
Second Informing Method Further, differently from the first informing method, the diagnosis section 102 performs the processes of steps S1031 to S1033 again and obtains (checks) the radio wave state, at the timings when the coping processes relating to the IP address setup (numbers "8" to "13" in FIG. 9) are informed to the user. Then, in a case where the obtained radio wave state has some problems, the diagnosis section 102 may inform the user of information which indicates the radio wave state and a sentence corresponding to the number "14" in FIG. 9, and the like. Here, the case where there are some problems in the radio wave state, for example, refers to a case other than the case where a result of step S1031 is Yes, a result of step S1032 is Yes, and a result of step S1033 is No.

Third Informing Method

Further, differently from the first and second informing methods, in a case where the diagnosis section 102 obtains the radio wave state stored in step S1034 from the predetermined memory, and there is a problem in the obtained radio wave state, the diagnosis section 102 may inform the user of information which indicates the radio wave state, a sentence corresponding to the number "14" in FIG. 9, and the like. Here, the case where there is a problem in the radio wave state refers to a case where reliability obtained from OK times of the radio waves is equal to a predetermined reference, for example, a case where a total number (OK times), where a result of step S1031 is Yes, a result of step S1032 is Yes, and a result of step S1033 is No, is within a predetermined range (for example, 3 times to 5 times).

Thus, even in a case where the radio wave state deteriorates at the time of diagnosis of the IP layer and the IP address check is not possible or the like, a possibility that there is a problem in the radio wave state or the like (information other than the diagnosis result of the IP layer) can be informed to the user. That is, in the printing system 10 according to the fourth modification, an appropriate coping process in which change in the radio waves based on a time elapse is considered can be informed to the user.

Fifth Modification

Further, in the above-described embodiment and the second to fourth modifications, a predetermined coping process is informed to the user, regardless of the radio wave state. However, the invention is not limited thereto. For example, a coping process informed to the user may be changed according to the radio wave state.

Specifically, in step S1031, the diagnosis section 102 classifies the radio field strength using a radio field strength determination table 600, with respect to radio waves output from the access point 300 to be connected.

FIG. 18 is a diagram illustrating an example of a schematic data structure of the radio field strength determination table 600.

As shown in the figure, the radio field strength determination field 600 classifies a case where the radio field strength is less than an X value as "low (bad)", classifies a case where the radio field strength is equal to or more than the X value and less than a Y value as "intermediate (not good and not bad)", and classifies a case where the radio field strength is less than the Y value as "high (good)".

By using the radio field strength determination field 600, the diagnosis section 102 can classify the radio field strength of the radio waves output from the access point 300 to be connected into "low" "intermediate" and "high" in step S1031. Of course, the invention is not limited to the three classifications, but may use classification of two stages, four stages or more.

Further, in step S1034, the diagnosis section 102 correspondingly stores the radio field strength obtained (checked) in step S1031 and the classified levels ("low", "intermediate" and "high") of the radio field strength in a predetermine memory.

Further, in a case where a state other than the radio waves is bad, the diagnosis section 102 reads the levels ("low", "intermediate" and "high") of the radio field strength from the predetermined memory, at the timings when the coping processes (numbers "4" to "13" in FIG. 9) corresponding to this case is informed to the user. Then, in a case where the level of the radio field strength is "high", in a similar way to the above-described embodiment, the diagnosis section 102 informs the user of the coping processes (numbers "4" to "13" in FIG. 9) in a case where the state other than the radio waves, as it is. Further, in a case where the level of the radio field strength is "intermediate", the diagnosis section 102 informs the user of the coping process (number "2" or "3" in FIG. 9) in a case where the radio wave state is bad, and the coping processes in a case where the state other than the radio waves is bad (numbers "4" to "13" in FIG. 9). Further, in a case where the level of the radio field strength is "low", the diagnosis section 102 informs the user of the coping process (number "2" or "3" in FIG. 9) in the case where the radio wave state is bad, in place of the coping processes (numbers "4" to "13" in FIG. 9) in a case where the state other than the radio wave is bad.

Accordingly, in the printing system 10 according to the fifth modification, it is possible to inform the user of a more appropriate coping process according to the radio wave state.

The invention is not limited to the classification of the radio field strength, and the radio wave state may be classified by generally considering the radio field strength, the noise strength, the presence or absence of other radio waves (SSID) in adjacent channels and the like. Further, the "radio field strength" in the fifth modification may be replaced with a "radio wave state".

Further, the communication performed between the second communication section 104 of the printer 100 and the second communication section 204 of the information processing apparatus 200 may be, if it is wireless communication, other communications such as an infrared communication, ultrasonic communication or the like. Further, the diagnosis section 102 may diagnose states of a transmission path of infrared rays or ultrasonic waves used in the respective communications.

What is claimed is:

1. A diagnosis method of diagnosing a communication method between a first information processing apparatus and a second information processing apparatus, the method comprising:
    transmitting a transmitting request that requests a diagnosis signal by a second communicated method to the second information processing apparatus from the first information processing apparatus using a first communication method which is different from the second communication method;
    transmitting a diagnosis signal to the first information processing apparatus from the second information processing apparatus using the second communication method, according to reception of the transmitting request; and
    determining that communication is possible using the second communication method if a signal received in the first information processing apparatus using the second communication method is the diagnosis signal.

2. The diagnosis method according to claim 1, wherein it is possible for the first information processing apparatus and the second information processing apparatus to communicate using the second communication method and the first communication method when it is determined that communication is possible using the first communication method.

3. The diagnosis method according to claim 1,
    wherein the first communication method comprises wired communication,
    wherein the second communication method comprises wireless communication, and
    wherein the first information processing apparatus and the second information processing apparatus have a wired connection when it is determined that communication is possible using the second communication method.

4. The diagnosis method according to claim 1, further comprising determining that communication has not been established as possible using the second communication method if the first information processing apparatus does not receive the diagnosis signal.

5. An information processing apparatus, comprising:
- a first communication section which communicates with an external device having a diagnosis function of a network using a first communication method;
- a second communication section which communicates with the external device using a second communication method; and
- a transmission section which transmits a diagnosis signal to the external device through the second communication section,
- wherein the transmission section transmits the diagnosis signal according to a transmitting request of a diagnosis signal, by the second communication method, received through the first communication section from the external device.

6. The information processing apparatus according to claim 5, wherein the transmission section transmits the diagnosis signal using a broadcast packet.

7. The information processing apparatus according to claim 5,
- wherein the transmitting request includes an IP address allocated to the external device, and
- wherein the transmission section transmits the diagnosis signal to the external device to which the IP address is allocated using a unicast packet.

8. The information processing apparatus according to claim 5, wherein the second communication section communicates with the external device through wireless communication.

9. The information processing apparatus according to claim 8,
- wherein the first communication section communicates with the external device through wired communication, and
- wherein it is possible for the first communication section and the external device to communicate through wired communication when the transmission section transmits the diagnosis signal through the second communication section.

10. The information processing apparatus according to claim 5, wherein the first communication section communicates with the external device through wired communication.

11. A non-transitory storage medium which stores a program which allows a computer to function as the information processing apparatus according to claim 5.

12. The information processing apparatus according to claim 5, wherein the first communication section and the external device have a wired connection when the transmission section transmits the diagnosis signal.

13. A communication apparatus comprising:
- a first communication section which communicates with an external device using a first communication method;
- a second communication section which communicates with the external device using a second communication method; and
- a diagnosis section which diagnoses communication through the second communication section,
- wherein the diagnosis section transmits a transmitting request of a diagnosis signal, by a second communication method, through the first communication section and determines that communication with the external device is possible in a case where the diagnosis signal is received through the second communication section.

14. The communication apparatus according to claim 13, wherein the second communication section communicates with the external device using wireless communication.

15. The communication apparatus according to claim 13, wherein the first communication section communicates with the external device using wired communication.

16. A non-transitory storage medium which stores a program which allows a computer to function as the communication apparatus according to claim 13.

* * * * *